(12) United States Patent
Jahns et al.

(10) Patent No.: US 12,215,780 B2
(45) Date of Patent: *Feb. 4, 2025

(54) STATE DYNAMIC TACHOMETER WITH ENHANCED FEEDBACK

(71) Applicant: PACCAR Inc, Bellevue, WA (US)

(72) Inventors: Steven Karl Jahns, Bellingham, WA (US); Ryan Anthony Reed, Kenmore, WA (US); Jonathan Scott Duncan, Seattle, WA (US); Josef Lotz, Pune (IN); Tristan Thomas Pyle, Bothell, WA (US); Derek Scott Sancer, Denton, TX (US); Jon Forrest Acton, Ft. Worth, TX (US); Jacob Michael White, Flower Mound, TX (US); Hervé Jen Raymond Cecchi, Santa Clara, CA (US); David Michael Gauch, Los Angeles, CA (US); Anna-Magdalena Schatz, Bensheim (DE)

(73) Assignee: PACCAR INC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,257

(22) Filed: Nov. 27, 2023

(65) Prior Publication Data

US 2024/0209934 A1 Jun. 27, 2024

Related U.S. Application Data

(63) Continuation of application No. 17/067,250, filed on Oct. 9, 2020, now Pat. No. 11,828,359.

(60) Provisional application No. 62/978,691, filed on Feb. 19, 2020, provisional application No. 62/978,698, filed on Feb. 19, 2020, provisional application No. 62/970,478, filed on Feb. 5, 2020.

(51) Int. Cl.
*F16H 63/42* (2006.01)
*F16H 61/02* (2006.01)

(52) U.S. Cl.
CPC ......... *F16H 61/0213* (2013.01); *F16H 63/42* (2013.01); *F16H 2063/426* (2013.01)

(58) Field of Classification Search
CPC . F16H 61/0213; F16H 63/42; F16H 2063/426
See application file for complete search history.

(56) References Cited

U.S. PATENT DOCUMENTS

| | | | |
|---|---|---|---|
| 4,873,891 A | 10/1989 | Guanciale | |
| 4,947,681 A | 8/1990 | Young | |
| 7,305,325 B2 * | 12/2007 | Kostyk | ............ G06Q 10/06395 702/183 |
| 10,604,014 B1 | 3/2020 | Dickinson | |
| 11,828,359 B2 * | 11/2023 | Jahns | .................. F16H 61/0213 |
| 2008/0306636 A1 | 12/2008 | Caspe-Detzer | |

(Continued)

*Primary Examiner* — Edwin A Young
(74) *Attorney, Agent, or Firm* — Merchant & Gould, P.C.

(57) ABSTRACT

A system, method, and computer readable storage device are provided for providing a dynamic tachometer. Based on various signal inputs from a plurality of data sources, a tachometer may be dynamically modified to include visual information and assistance to the driver in relation to the vehicle's engine speed (i.e., revolution speed of the vehicle's crankshaft). The tachometer may include one or a combination of: dynamic shift point indicators, a target engine speed range indicator, an overspeed indicator, and a power take-off mode indicator.

20 Claims, 15 Drawing Sheets

(56) References Cited

U.S. PATENT DOCUMENTS

| | | |
|---|---|---|
| 2009/0273459 A1 | 11/2009 | Crave |
| 2011/0208384 A1 | 8/2011 | Tarte |
| 2021/0237572 A1 | 8/2021 | Jahns |
| 2021/0237573 A1 | 8/2021 | Jahns |
| 2021/0237574 A1 | 8/2021 | Jahns |
| 2021/0237576 A1 | 8/2021 | Jahns |

* cited by examiner

STATE DYNAMIC TACHOMETER WITH ENHANCED FEEDBACK

CROSS-REFERENCE TO RELATED APPLICATIONS

This application is a continuation of U.S. patent application Ser. No. 17/067,250, filed Oct. 9, 2020, now U.S. Pat. No. 11,828,359, which claims the benefit of U.S. Provisional Application No. 62/970,478, having the title of "STATE DYNAMIC TACHOMETER WITH ENHANCED FEEDBACK" and the filing date of Feb. 5, 2020, U.S. Provisional Application No. 62/978,691, having the title of "INSTRUMENT CLUSTER USER INTERFACE" and the filing date of Feb. 19, 2020, and U.S. Provisional Application No. 62/978,698, having the title of "INSTRUMENT CLUSTER USER INTERFACE" and the filing date of Feb. 19, 2020, which are incorporated herein by reference in their entireties.

BACKGROUND

Engine speed indicators for vehicles typically have been analog devices having a dial and a rotating needle that points to indicia printed on the dial to provide a visual indication and measurement of engine speed. For example, engine speed may be a variable used for determining when to shift, when the vehicle may be operating efficiently with respect to fuel economy, within bounds of an overspeed range, or within bounds of a power take-off function, among other vehicle operations.

In some examples, currently, to shift a non-synchromesh manual transmission properly, the driver may be required to match engine speed and road speed within a threshold in order to engage a particular gear. When shifting up or down a gear, the driver may make mental calculations and time an input action for each shift to increase or decrease engine speed and hit the correct point of engagement of the gear lever when the transmission gear and engine speed combination can accept that engagement given road speed variables and configuration variables of the truck. As can be appreciated, properly shifting a non-synchromesh manual transmission, can be complex and difficult to learn and to execute optimally such that engagement is smooth, engine speed does not exceed an overspeed threshold, and fuel economy or transmission output torque is maximized. Moreover, excessive wear and damage to a vehicle's engine and transmission can occur when a novice driver does not understand or is unable to determine gear shift points.

Additionally, a vehicle may realize optimal fuel economy performance when the vehicle operates within a target optimal engine speed range. However, current tachometers may either not indicate this optimal engine speed range or may not provide an indication of when the vehicle is operating within the optimal engine speed range. In some cases, if an indication of when the vehicle is operating within the optimal engine speed range is provided, the indication may illuminate during core acceleration where the tachometer needle may sweep through the optimal engine speed range quickly and frequently, which can be distracting to the driver and reduce safety.

Further, depending on an engine a vehicle is configured with and how the engine is configured, the vehicle's engine speed maximum limit point (e.g., redline) may vary. As can be appreciated, providing a physical mark on a physical tachometer may require increased (inefficient) part inventory due to high part variability and may not be dynamically emphasized when a vehicle is approaching or operating past the vehicle's engine speed maximum limit point. As can be appreciated, if a driver of the vehicle is not mindful of the vehicle's engine speed maximum limit point or mindful of when the vehicle's measured engine speed is approaching or operating past the vehicle's engine speed maximum limit point, the vehicle may exceed the limit point where engine damage may occur.

Additionally, when a vehicle is configured with power take-off functionality, the tachometer may not be designed to provide power take-off related information clearly or in a way to augment driver understanding of power take-off operation. Accordingly, a driver may not utilize power take-off control functions that may facilitate power take-off operation and protect equipment.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing a dynamic tachometer.

In one aspect, a method for providing a dynamic tachometer is provided. In an example embodiment, the method comprises: determining a transmission gear ratio between a rotational speed of a current gear and one or more other gears based on stored vehicle configuration values associated with a vehicle; monitoring the vehicle's road speed; based on the one or more transmission gear ratios, the current gear, and the current road speed, determining one or more target gear shift points indicative of one or more target engine speeds at which smooth engagement into the one or more other gears can be accomplished; providing, in relation to the tachometer, one or more visual indications of the one or more target gear shift points; determining, based on a subsequent road speed, one or more updated target gear shift points; and dynamically updating locations of the one or more visual indications of the one or more target gear shift points based on the updated target gear shift points.

In another example embodiment, the method comprises: accessing a stored target engine speed range determined to optimize fuel economy for the vehicle; providing, in relation to the tachometer, an indication of the target engine speed range displayed in a first state; monitoring the vehicle's engine speed; and when the vehicle is operating within a cruise speed threshold and the vehicle's engine speed is within the target engine speed range, updating the visual indication of the target engine speed range to a second state to indicate that the vehicle is operating within the target engine speed range.

In another example embodiment, the method comprises: determining a maximum engine speed threshold value below which the vehicle is configured to operate; providing, in relation to the tachometer, an indication of the maximum engine speed threshold value; determining an engine speed warning threshold value based on the maximum engine speed threshold value; providing, in relation to the tachometer, a first visual overspeed indication when the vehicle's engine speed meets or exceeds the engine speed warning threshold value and is less than the maximum engine speed threshold value; and updating the first visual overspeed indication to a second visual overspeed indication when the vehicle's subsequent engine speed meets or exceeds the maximum engine speed threshold value.

In another example embodiment, the method comprises: in response to receiving an indication of actuation of a power takeoff (PTO): updating the tachometer by: replacing a range of normal operating mode engine rotation speeds with a range of engine rotation speeds associated with PTO operation; and including a visual indication of upper and lower PTO operation engine speed limit values; accessing a preset engine speed value associated with a PTO mode; displaying an indication of the preset engine speed value in a first state in relation to the range of engine rotation speeds associated with PTO operation; and when the PTO mode is engaged and PTO speed control is active, updating the display of the indication of the preset engine speed value to a second state to indicate engagement of the PTO mode and activation of the PTO speed control.

In another aspect, a system is provided that is configured to perform one or more of the example embodiments of the method. In another aspect, a computer-readable storage device is provided, wherein the computer-readable storage device includes computer readable instructions, which when executed by a processing unit, are configured to perform one or more of the example embodiments of the method.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1A:
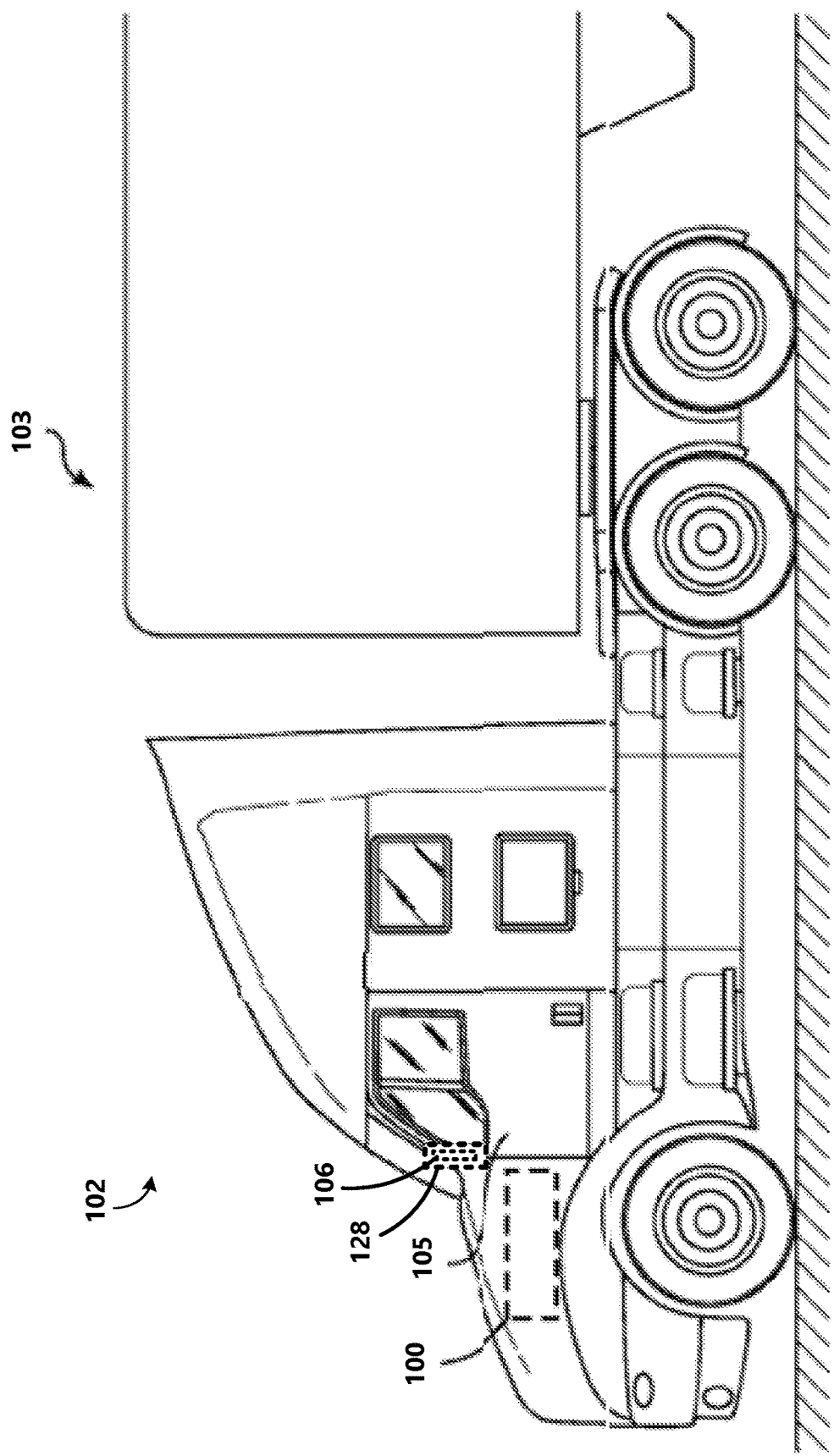
FIG. 1A is an illustration depicting a side view of an example vehicle.

Aspects of the present disclosure are generally directed to systems, methods and computer readable storage media for providing a recommended vehicle configuration based on customer use case-specific performance impacts. The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

FIG. 1A depicts a side view of a vehicle 102. The vehicle 102 may be a part of a tractor-trailer combination, which may include the vehicle 102 having a so-called fifth wheel by which a box-like, flat-bed, or tanker semi-trailer 103 (among other examples) may be attached for transporting cargo or the like. While the vehicle 102 is depicted as a truck in FIG. 1A, it should be appreciated that the present technology is applicable to any type of vehicle where a dynamic tachometer is desired.

The example vehicle 102 includes a cabin 105 from which a driver may operate the vehicle 102. The cabin 105 includes a display screen 128 on which at least a portion of an instrument cluster 107 comprising a dynamic tachometer 106 may be displayed. According to one aspect, the instrument cluster 107 is configured to provide vehicle status-related information to the driver of the vehicle 102. Information included in the displayed instrument cluster 107 and display attributes of the information may be determined by an instrument cluster display system 100 of the vehicle 102. Components and operations of an example instrument cluster display system 100 are discussed in further detail below.

Figure 1B:
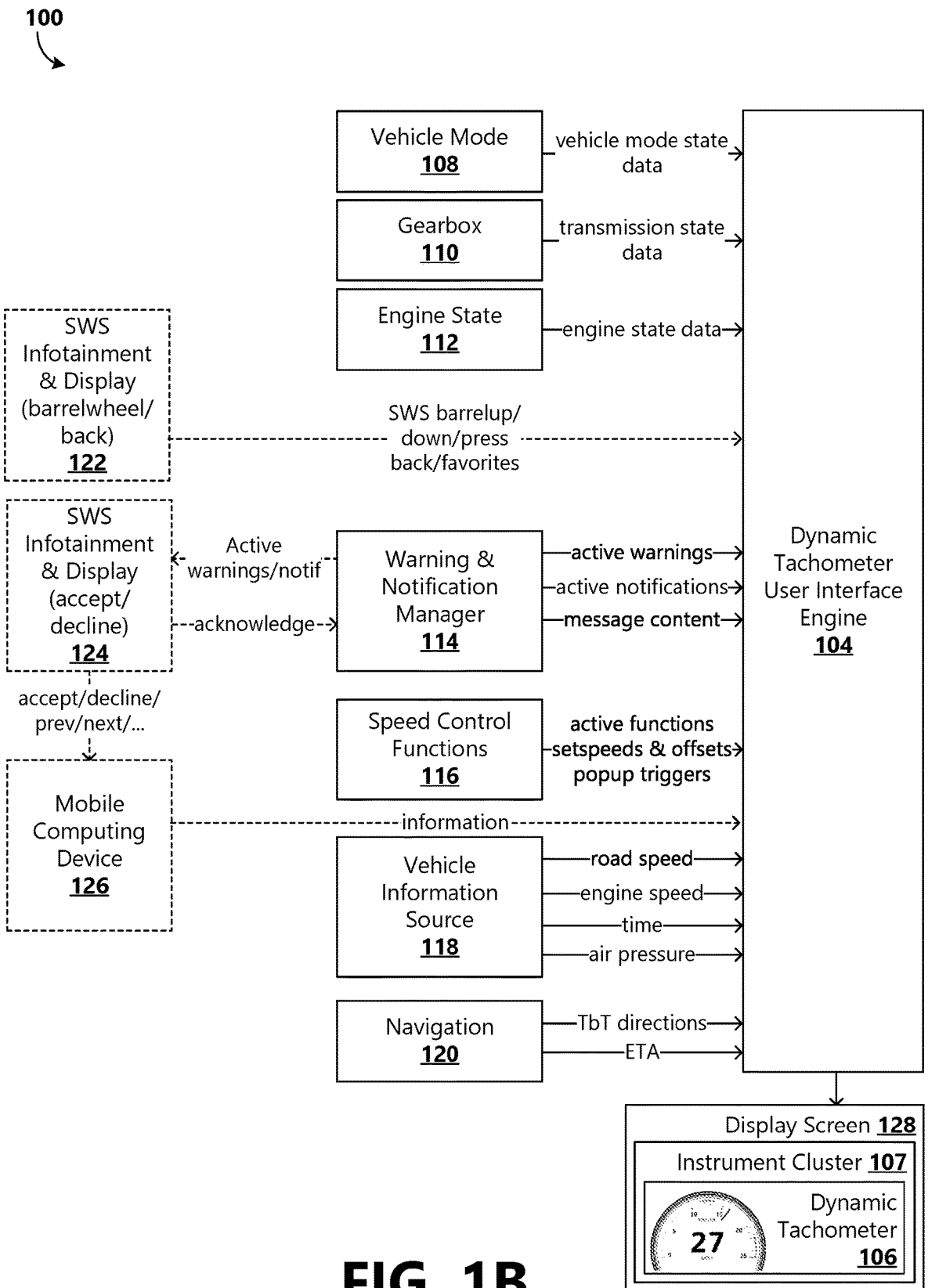
FIG. 1B is a block diagram of an example system of the present disclosure according to an embodiment.
Figure 2:
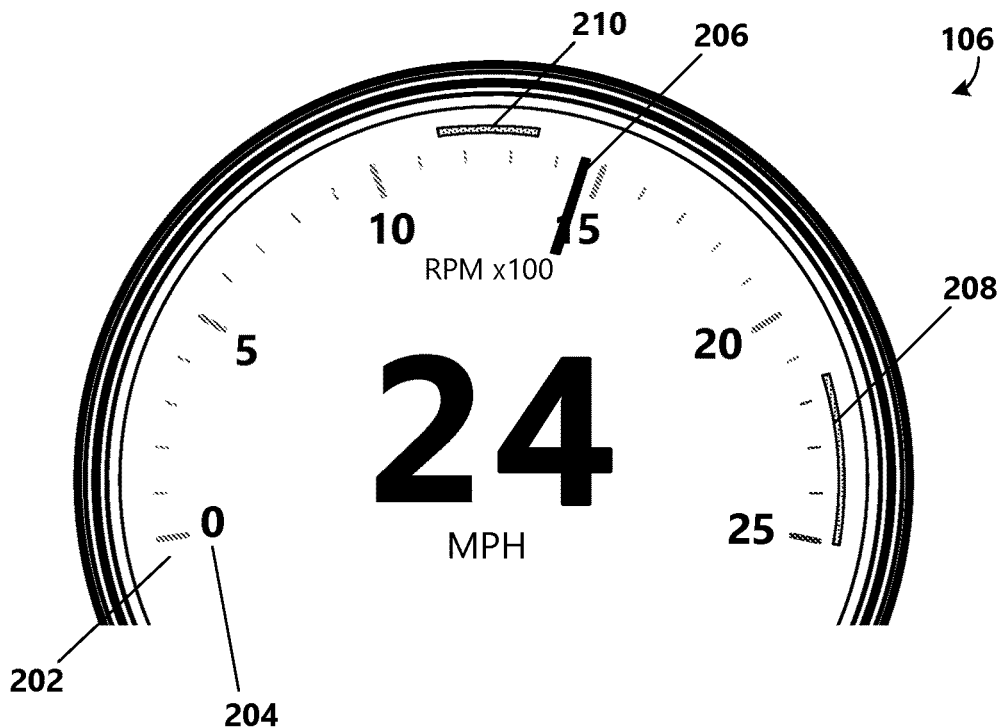
FIG. 2 is an illustration of an example dynamic tachometer display including an indication of a target engine speed range to optimize fuel economy of the vehicle and an indication of a maximum engine speed threshold.

With reference to FIG. 1B, a schematic block diagram is provided of an example instrument cluster display system 100 in which aspects of the present disclosure can be implemented. For example, some or all of the elements included in the instrument cluster display system 100 may be embodied in the vehicle 102. The example instrument cluster display system 100 includes various data sources in communication with a dynamic tachometer user interface (UI) engine 104. According to an aspect, the dynamic tachometer UI engine 104 is illustrative of a computing system of vehicle 102 that is operative or configured to receive various signal inputs from a plurality of data sources and provide a dynamic tachometer 106 for display to a driver of the vehicle 102. For example, the dynamic tachometer 106 may be utilized for providing visual information and assistance to the driver in relation to the vehicle's engine speed (i.e., revolution speed of the vehicle's crankshaft).

The plurality of data sources may include any suitable data source, unit, or sensor operative to provide various data or signaling information that may be used by the dynamic tachometer UI engine 104 to provide vehicle engine revolution speed-related information via the dynamic tachometer 106. The plurality of data sources can include, but are not limited to, a vehicle mode data source 108, a gearbox data source 110, an engine state data source 112, a warning and notification manager 114, a speed control function data source 116, a vehicle information data source 118, and a navigation data source 120. In some examples, the plurality of data sources further include steering wheel switch (SWS) infotainment and display actuation data sources 122, 124 (e.g., via a barrelwheel/back actuator (122) or an accept/decline actuator (124)) and a mobile computing device 126 in communication with the dynamic tachometer UI engine 104. As can be appreciated, in other examples, additional or alternative data sources are possible and are within the scope of the present disclosure.

In an example aspect: the vehicle mode data source 108 is operative to provide vehicle mode state data; the gearbox data source 110 is operative to provide transmission state data; the engine state data source 112 is operative to provide engine state data; the warning and notification manager 114 is operative to provide information associated with active warnings, active notifications, and message content; the speed control function data source 116 is operative to provide information associated with active functions, set speed values, offset values, and popup triggers; the vehicle information data source 118 is operative to provide information associated with the vehicle's road speed, engine speed, and air pressure, and time; and the navigation data source 120 is operative to provide turn-by-turn direction information and estimated arrival time (ETA) information in association with a navigable route.

According to an aspect, the dynamic tachometer UI engine 104 is operative or configured to provide vehicle engine revolution speed-related information that may be presented by the dynamic tachometer 106. Examples of vehicle engine revolution speed-related information that may be presented by the dynamic tachometer 106 include, but are not limited to, information related to the vehicle's engine speed, target engine speed shift points, target engine speed range associated with optimal vehicle fuel economy, engine overspeed, and engine speed associated with power takeoff (PTO) utilization. The vehicle engine revolution speed-related information and aspects of the presentation of the information by the dynamic tachometer 106 are described with reference to an example dynamic tachometer 106 illustrated in FIGS. 2-12. In some examples, the dynamic tachometer 106 may be presented on a re-configurable digital display screen 128. For example, a tachometer may be graphically represented as an analog meter on a display screen 128 provided in the cab 105 of the vehicle 102, and vehicle engine revolution speed readings and engine revolution speed-related information may be represented in relation to the displayed representation of the analog meter. In other examples, the dynamic tachometer 106 may be presented via an array of light-emitting diodes (LEDs). For example, a traditional analog mechanical gauge tachometer may be provided in the cab of the vehicle 102, and vehicle engine revolution speed readings and engine revolution speed-related information may be represented by LEDs positioned and lit in relation to the mechanical gauge tachometer.

In some examples, such as when the dynamic tachometer 106 is presented as a graphical representation of an analog meter on a digital display screen 128, the graphical representation may include a scale 202 with numerical identifiers 204 and a needle 206. In other examples, such as when the dynamic tachometer 106 is presented as LEDs positioned and lit in relation to a mechanical gauge tachometer, the scale 202 and numerical identifiers 204 may be part of the mechanical gauge, and the needle 206 may be graphically represented via LEDs. Other combinations of mechanical and graphically displayed features are possible and are within the scope of the present disclosure. The scale 202 and numerical identifiers 204 may be utilized to represent a scale of values of revolutions per minute (RPM) of the vehicle's crankshaft. In some examples, the scale 202 range (e.g., 0 RPM-2500 RPM, 0 RPM-3000 RPM) may be based on/appropriate for the engine installed in the vehicle 102. In some examples, the needle 206 may be displayed behind the numerical identifiers 204 and in front of the scale 202. In other examples, the needle 206 may be displayed in front of the numerical identifiers 204 and the scale 202. When the vehicle 102 increases or decreases the engine speed, the needle 206 of the dynamic tachometer 106 may be animated to react similarly to a needle of a traditional mechanical gauge tachometer.

According to an aspect, the dynamic tachometer 106 includes an overspeed range (sometimes referred to the "redline") indicator 208. The overspeed range represented by the overspeed range indicator 208 may be specified by a manufacturer of the vehicle's engine and represents a maximum rotational speed at which the engine and its components are designed to operate without causing damage to the components themselves or other parts of the engine. For example, different engine and different configurations of a same type of engine can have different overspeed ranges. The vehicle's overspeed range may be stored in memory and accessed by the dynamic tachometer UI engine 104. Illustrations of an example overspeed range indicator 208 are shown in FIGS. 2-10. According to an aspect, properties associated with the display of the overspeed range indicator 208 may be based on a measured engine speed. For example, saliency of the overspeed range indicator 208 may be dynamically modified based on whether the vehicle's engine speed is within a safe RPM range, is approaching the overspeed range, or is within the overspeed range. As can be appreciated, being able to dynamically display the overspeed range based on the vehicle's configuration enables a manufacturer to carry less inventory than if a physical tachometer with a physical overspeed range marking is utilized, where part variability may be high due to high engine configuration variability.

The overspeed range indicator 208 may be displayed in a first state when the vehicle's engine speed is within the safe RPM range, wherein the safe RPM range may be determined as a range between 0 RPM and a starting RPM value of a warning threshold range of the overspeed range (e.g., 100 RPM from a starting value of the overspeed range). In the first state, the overspeed range indicator 208 may be displayed as an educational indication of the overspeed range. In some examples, the overspeed range indicator 208 is displayed as a colored light band starting at a starting RPM value and ending at an ending RPM value of the overspeed range. In the first state, the overspeed range indicator 208 may be comparatively dim in brightness level (e.g., in comparison with second and third states described below). Examples of the overspeed range indicator 208 being displayed in the first state are shown in FIGS. 2-8. In the illustrated examples, the overspeed range indicator 208 has a starting RPM value of 2175 RPM and an ending RPM value of 2500 RPM.

Figure 9:
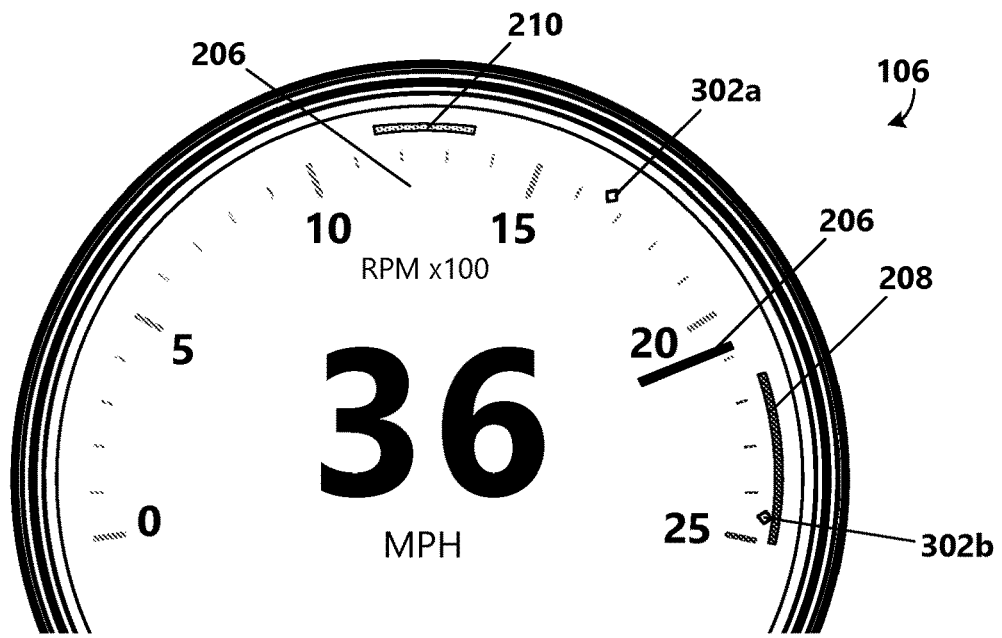
FIG. 9 is an illustration of the example dynamic tachometer display of FIG. 8 including an indication that the vehicle's engine speed exceeds an engine overspeed warning threshold value, and wherein the positions of the target gear shift point indicators are updated as the vehicle's road speed changes.

The overspeed range indicator 208 may be displayed in the second state when the vehicle's engine speed meets or exceeds the starting RPM value of the warning threshold range of the overspeed range and is below the starting RPM value of the overspeed range. As an illustrative example, if the starting RPM value of the overspeed range is 2175 RPM, and the warning threshold range has a starting value that is 100 RPM from the starting value of the overspeed range, the starting value of the warning threshold range is 2075. Accordingly, the overspeed range indicator 208 may be displayed in the second state when the vehicle's engine speed is between 2075 RPM and 2175 RPM. An example of the overspeed range indicator 208 being displayed in the second state is shown in FIG. 9. The second state may be a first level warning state, wherein the level of salience may be increased between the first state and the second state to warn the driver that the engine speed is approaching the overspeed range. For example, the warning may alert the driver to make an adjustment in acceleration or gear selection to avoid further escalation of the engine speed into the overspeed range. In the second state, the overspeed range indicator 208 may be transitioned from an educational indication of the overspeed range to a first level warning indication. In some examples, in the second state, a line weight of the overspeed range indicator 208 may be increased. In some examples, the brightness of the overspeed range indicator 208 may be increased between the first state and the second state.

Figure 10:
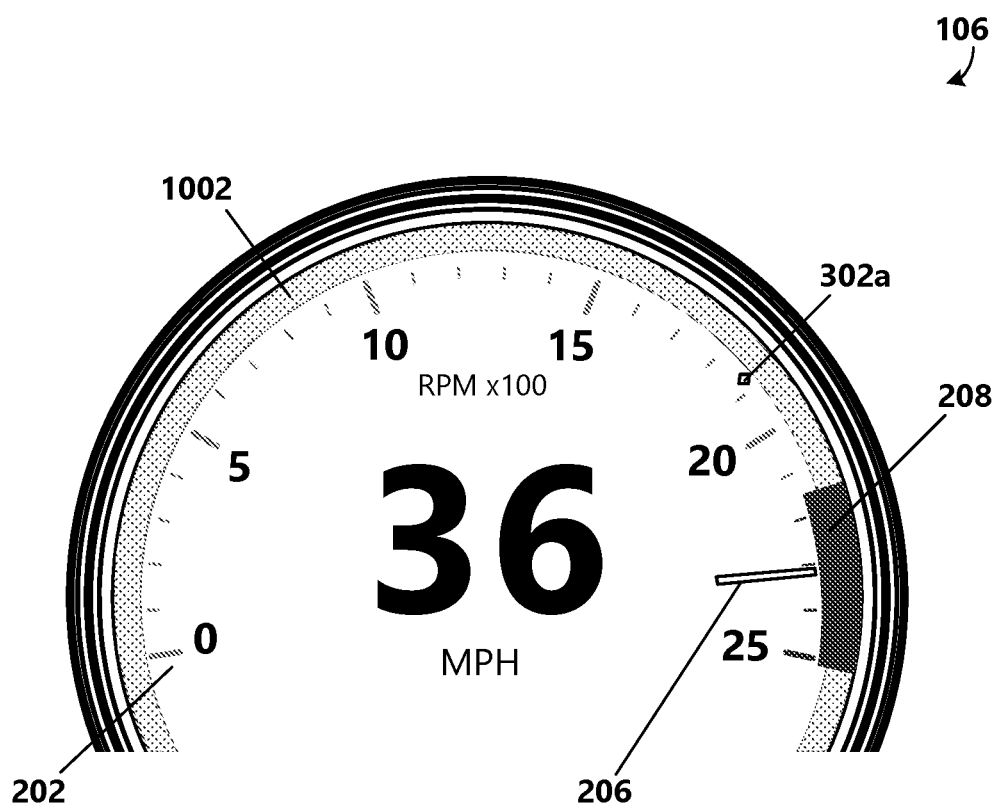
FIG. 10 is an illustration of the example dynamic tachometer display of FIG. 9 including an indication that the vehicle's engine speed exceeds an engine overspeed threshold value.

The overspeed range indicator 208 may be transitioned from the second state to the third state when the vehicle's engine speed meets or exceeds the starting RPM value of the overspeed range. As an illustrative example, if the starting RPM value of the overspeed range is 2175 RPM, the overspeed range indicator 208 may be displayed in the third state when the vehicle's engine speed is at or above 2175 RPM. An example of the overspeed range indicator 208 being displayed in the third state is shown in FIG. 10. The third state may be a critical level warning state, wherein the level of salience may be increased between the second state and the third state to warn the driver that the engine speed is not operating within a safe range and that engine damage is possible. In some examples, in the third state, the line weight and the brightness level of the overspeed range indicator 208 may be further increased from the second state. In some examples, in the third state, the color of the needle 206 may be changed (e.g., from red to white). In some examples, for increased salience, the dynamic tachometer 106 may include a background glow 1002 during an overspeed event (i.e., when the engine speed is in the overspeed range). In further examples, for increased salience, an audible warning may be played. As should be appreciated, additional and/or alternative methods, which are within the scope of the present disclosure, may be utilized to convey an increasing level of warning to the driver in relation to an increase of the engine speed to and within the overspeed range.

In some examples, the vehicle 102 may include a dedicated onboard vehicle tracking device that allows the sending, receiving and storing of telemetry data and event information (e.g., overspeed event information). For example, when an overspeed event occurs, the event and associated information (e.g., RPM values, time, temperature values) may be recorded. A report of the overspeed event may be generated, for example, for inspection of the vehicle for possible engine damage, for driver performance metrics, etc. In some examples, the device may be configured to connect via the vehicle's onboard diagnostics (ODBII), CAN (Controller Area Network) bus port, or other technology with a SIM card, and an onboard modem may enable communication through a wireless network. In some examples, the telemetry and event data may be transmitted via GPRS (General Packet Radio Service), a mobile data and cellular network, or satellite communication to a server computing device.

According to an aspect, the dynamic tachometer 106 may further include a target engine speed range indicator 210. The target engine speed range indicator 210 (sometimes referred to as a "sweet spot" indicator) may represent a target engine speed range at which the vehicle 102 is determined to run most efficiently with respect to fuel economy. In some examples, the target engine speed range may be determined and specified by a manufacturer of the vehicle's engine. In other examples, the target engine speed range may be determined for the vehicle 102 based on an analysis of actual engine speed and fuel usage data. According to one example aspect, the target engine speed range may be based on a determined most efficient RPM value in relation to fuel consumption of the vehicle 102 as configured, and the bounds of the target engine speed range may be +/−50 MPH of the determined most efficient RPM value. In some examples, the target engine speed range indicator 210 may be displayed when the vehicle's transmission is in a park mode or a drive mode and when the PTO mode is disabled. In some examples, the target engine speed range indicator 210 may be displayed only when the vehicle's measured road speed is within a cruise speed threshold (e.g., a range of vehicle road speeds in upper gears). In other examples, salience of the target engine speed range indicator 210 may be dynamically increased only when the vehicle's measured road speed is within the cruise speed threshold. For example, the target engine speed range indicator 210 or increased salience of the target engine speed range indicator 210 may not be displayed when the vehicle's measured road speed is within a cruise speed threshold such that, during core acceleration where the tachometer needle 206 may sweep through the target engine speed range quickly and/or frequently, driver distraction may be averted.

According to an aspect, the location of the target engine speed range indicator 210 in relation to the tachometer scale 202 is indicative of the associated RPM values included in the target engine speed range and may be displayed in a manner that informs the driver of the vehicle 102 of the RPMs associated with the target engine speed range. In one example, the target engine speed range indicator 210 may be displayed as a colored light band starting at a starting RPM value and ending at an ending RPM value representative of the bounds of the target speed range. Illustrations of an example target engine speed range indicator 210 are shown in FIGS. 2-10. In the illustrated examples, the lower bound of the target speed range determined for the vehicle 102 is 1150 RPM, and the upper bound of the target speed range is 1350 RPM.

According to an aspect, a dynamic display of and the properties associated with the display of the target engine speed range indicator 210 may be based on the vehicle's transmission state, PTO mode state, measured engine speed, and road speed. For example, saliency of the target engine speed range indicator 210 may be dynamically modified based on whether the vehicle's measured engine speed is within or outside the bounds of the target engine speed range. When the vehicle's measured engine speed is outside the bounds of the target engine speed range, the target engine speed range indicator 210 may be displayed in a first state. In the first state, the target engine speed range indicator 210 may be displayed as an educational indication of the target engine speed range. Examples of the target engine speed range indicator 210 being displayed in the first state are shown in FIGS. 2, 3, and 7-9. For example, in FIG. 2, the vehicle's measured engine speed as indicated by the location of the needle 206 is 1460 RPM, which is outside the target engine speed range (e.g., 1150 RPM-1350 RPM). Accordingly, the target engine speed range indicator 210 may be displayed in the first state. In the first state, the target engine speed range indicator 210 may be comparatively dim in brightness level (e.g., in comparison with a second state described below).

Figure 4:
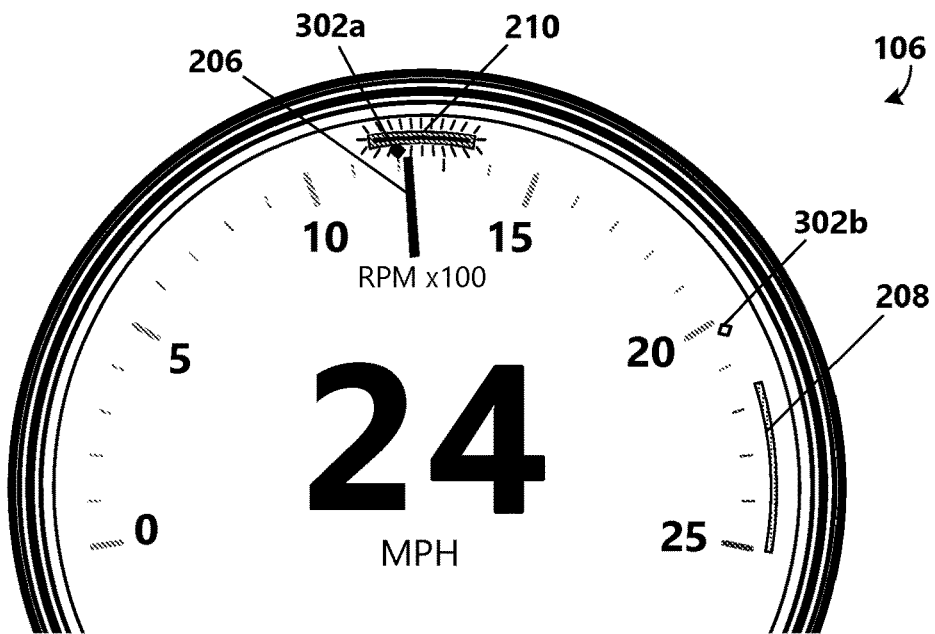
FIG. 4 is an illustration of the example dynamic tachometer display of FIG. 3 including an indication that the vehicle's engine speed is within the target engine speed range and an indication that the vehicle's engine speed is within a threshold of a target gear shift point.
Figure 5:
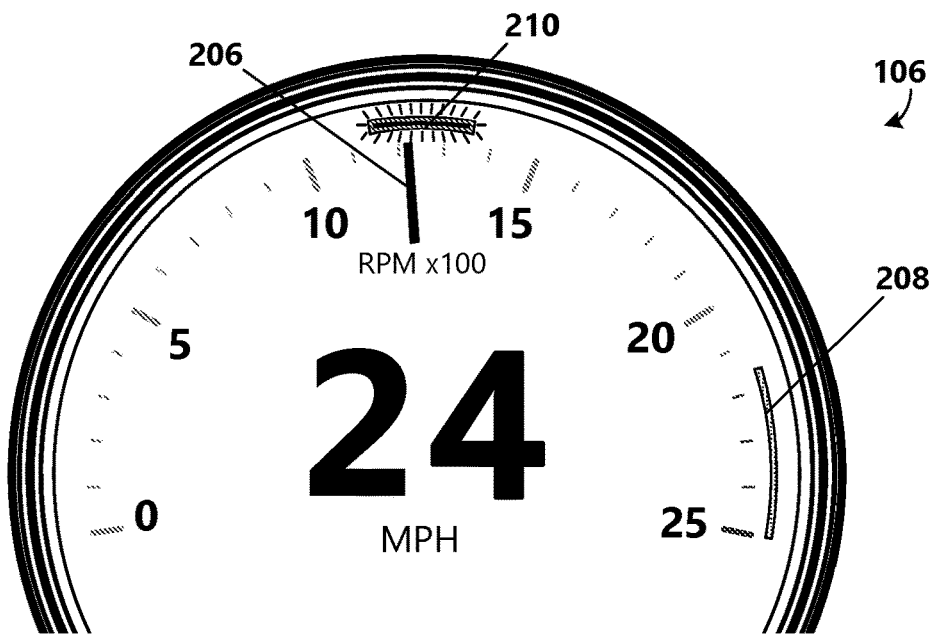
FIG. 5 is an illustration of the example dynamic tachometer display of FIG. 4, wherein the target gear shift point indicators are removed from display as a new gear is engaged.
Figure 6:
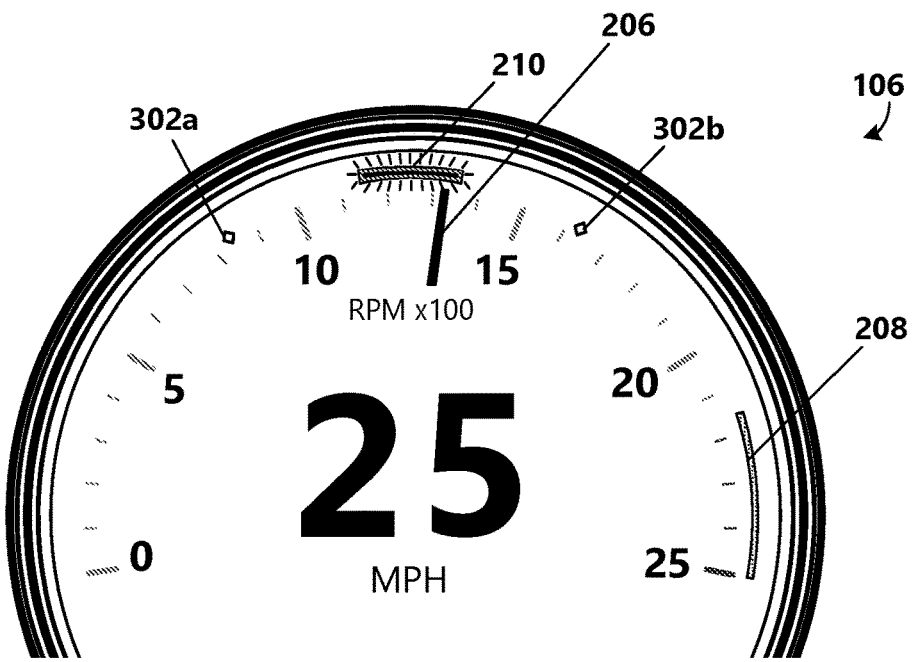
FIG. 6 is an illustration of the example dynamic tachometer display of FIG. 5, wherein positions of the target gear shift point indicators are updated based on the newly-engaged gear and vehicle road speed.

When the vehicle's measured engine speed is within the bounds of the target engine speed range, the target engine speed range indicator 210 may be displayed in the second state. In the second state, the target engine speed range indicator 210 may be displayed as indication that the vehicle 102 is operating within the target engine speed range and thus, is operating within a range of engine speeds for optimizing fuel efficiency. Examples of the target engine speed range indicator 210 being displayed in the second state are shown in FIGS. 4-6. For example and with reference to FIG. 6, the measured engine speed is shown as 1315 RPM as indicated by the position of the needle 206, and is within the target engine speed range (e.g., 1150 RPM-1350 RPM) as indicated by the target engine speed range indicator 210. In the second state, the target engine speed range indicator 210 may have comparatively increased saliency than in the first state. For example, the brightness/intensity level of the target engine speed range indicator 210 may be increased from a duller level provided in the first state to a brighter or more intense level in the second state as indicated by the marks radiating from the target engine speed range indicator 210 illustrative of brightness/intensity of the indicator. In some examples, information associated with whether the vehicle 102 is operating within the target engine speed range may be recorded. For example, an amount of time the vehicle driver drives in the target engine speed range may be measured as part of tracking vehicle and/or driver performance.

According to an aspect, the dynamic tachometer 106 may further include one or more target shift point indicators 302a-n (generally 302). The target shift point indicators 302 may represent engine speed values (i.e., target shift points) at which smooth engagement into one or more next gears can be accomplished. In some examples, a next gear can include a next sequential gear up or down that the transmission can switch to from the current gear. In other examples, a next gear can include additional non-sequential gears, such as gears that the transmission can be shifted to that may skip another gear (e.g., when a skip-shift can be performed). The target shift point indicators 302 may be utilized in a vehicle 102 configured with a manual transmission or an automated transmission operating in manual mode. When utilized in a vehicle 102 with a non-synchromesh transmission where double clutching is required, the target shift point indicators 302 may denote a target RPM to hit on the gear change during the double clutching gear changing sequence as the driver transitions from one gear to the next. For example, to properly shift a vehicle 102 with a non-synchromesh manual transmission, the driver of the vehicle may have to match engine speed and road speed in order to engage a particular gear. Without implementation of aspects of the present disclosure, when shifting up or down a gear, the driver may have to make mental calculations and time their input action for each shift to increase or decrease engine speed in order to hit the correct point of engagement. The target shift point indicators 302 included in aspects of the present disclosure provide an indication that can aid the driver in the shifting of a non-synchromesh transmission or an automated transmission in manual mode by dynamically indicating, via the target shift point indicators 302, a calculated engine speed at which one or more transmission gears can accept engagement from a current gear based on road speed variables and vehicle configuration variables (e.g., engine, engine torque, transmission configuration, transmission selection, rear end axle differential ratio, vehicle weight, grades the vehicle is on, tire height). For example, a vehicle transmission may have a unique set of gears for that transmission specification. As an example, a first vehicle 102 may be configured with a 12-speed engine having 12 forward gears and 2 reverse gears. Accordingly, the vehicle 102 has 12 forward gear ratios and 2 rear gear ratios that determine how many RPMs the engine will need to increase or drop to engage the next gear. The RPM differential between the gears of the first vehicle 102 may be larger than the RPM differential between gears of a second vehicle that may be configured with a 18-speed engine having 18 forward gears and 4 reverse gears. Additionally, a vehicle 102 may be configured with an auxiliary transmission or have a 2-speed rear axle that allows the driver to select between two different gear ratios within the rear axle. Additionally, various engines may have different horsepower and torque values. In some examples, selection of a transmission and rear axle ratio may be based on an amount of weight the vehicle 102 is pulling and the surface grades on which the vehicle is driving. For example, a startability grade (i.e., the grade the vehicle 102 can start on with a given weight) may be used to determine the transmission and rear axle gearing.

Examples of target shift point indicators 302 are shown in in FIGS. 3, 4, and 6-10. The target shift point indicators 302 may be displayed in a manner that informs the driver of the vehicle 102 of the RPMs associated with the target shift points. In one example, the target shift point indicators 302 may be displayed as markers located in relation to the RPMs of the target shift points. For example and with reference to FIG. 3, a first gear target shift point indicator 302a may be displayed in relation to an engine speed (e.g., 1200 RPM) at which the driver can lower the vehicle's engine speed down to from the vehicle's current measured speed (e.g., 1610 RPM) in order to shift to a lower gear, and a second gear target shift point indicator 302b may be displayed in relation to an engine speed (e.g., 2020 RPM) in order to shift to a higher gear. In some examples, a gear target shift point indicator 302 may be displayed as a colored shape, such as a diamond shape as illustrated in FIGS. 3, 4, and 6-10 or other shape (e.g., triangle, circle, square, rectangle), a pointer, or other type of indicator of an RPM value. In some examples, a gear target shift point indicator 302 may include an indication of the gear (e.g., $4^{th}$ gear, $5^{th}$ gear, $6^{th}$ high gear, $7^{th}$ low gear) associated with the target shift point/target RPM. In other examples, gear target shift point indicators 302 may further inform the driver of an RPM range the tachometer needle 206 may reside in due to a transmission gear up or down shift.

Figure 3:
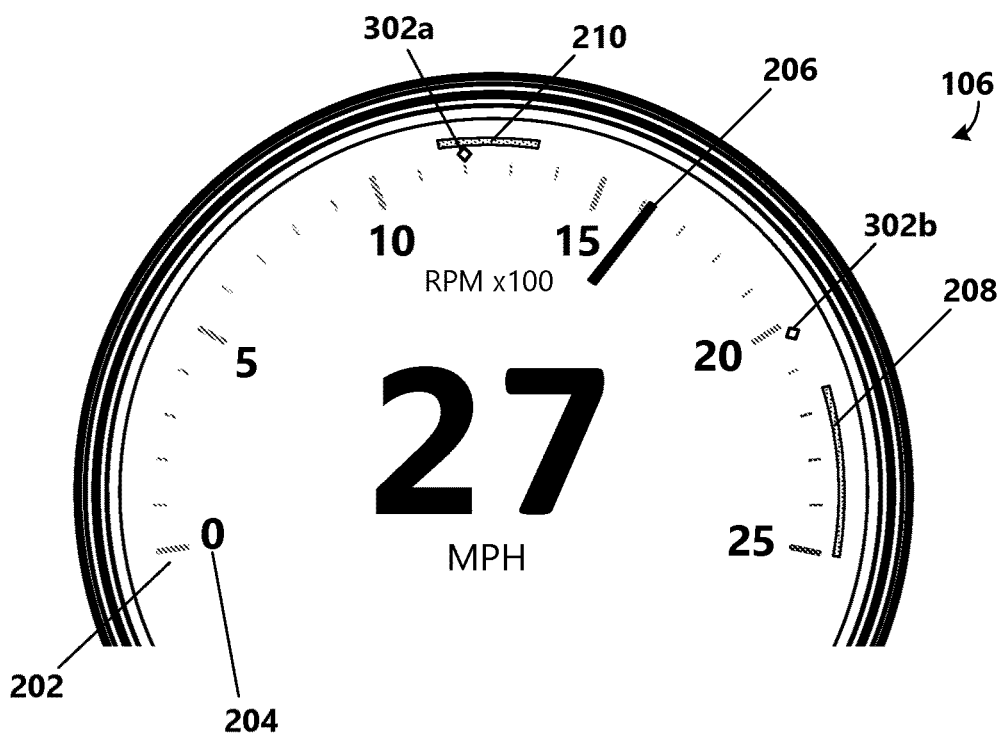
FIG. 3 is an illustration of the example dynamic tachometer display of FIG. 2 including a display of target gear shift point indicators.

The distance between the target shift point indicators 302 may be determined by the gear ratios for the particular transmission configured on the vehicle 102 and, if applicable, on the particular transmission selected. According to an aspect, dynamic display properties of the target shift point indicators 302 may be based on the vehicle's transmission state, measured engine speed, and measured road speed. For example, the target shift point indicators 302 may dynamically sweep with the vehicle's current engine speed, and when the clutch is opened, the target shift point indicators 302 may rise or fall depending on the vehicle's road speed. In some examples, the dynamic display properties may be further based on the grade of the surface on which the vehicle 102 is driving. Further, saliency of the target shift point indicators 302 may be dynamically modified based on whether the vehicle's measured engine speed is within a threshold of an associated target shift point. According to an aspect and as illustrated in FIG. 3, target shift point indicators 302a,b may be displayed in a first state when the vehicle's measured engine speed is outside the threshold of the associated target shift point. For example, in FIG. 3, the vehicle's measured engine speed is just above 1600 RPM, which is above the ideal engine speed for optimal fuel economy as shown by the target speed range indicator 210. Performing a shift to a higher gear would lower the RPM's into that ideal engine speed as shown by the shift point indicator 302a which is within the bounds of that target speed range indicator zone 210. Alternatively, the second gear target shift point associated with the second gear target shift point indicator 302b shows that a down shift would bring the engine speed even further away from the ideal engine speed for fuel economy 210, but also not yet into the engine overspeed range indicator 208. Accordingly, the target shift point indicators 302a,b are displayed in the first state. In the first state, the target shift point indicators 302 may be displayed as educational indications of the gear target shift points. In the first state, the target shift point indicators 302 may be comparatively dim in brightness level (e.g., in comparison with a second state described below).

With reference now to FIG. 4, the first gear target shift point indicator 302a is shown dynamically modified to the second state, wherein in the second state, a target shift point indicator 302 may be displayed as an indication that the vehicle's engine speed is within a shift point threshold where smooth engagement with an associated gear can be accomplished. For example and with reference to FIG. 4, the measured engine speed is shown as 1215 RPM as indicated by the position of the needle 206, and is within a threshold of the first gear target shift point as indicated by the first gear target shift point indicator 302a. In this case, the clutch of a manual transmission configuration has been applied and the driver is in the midst of performing a shift and attempting to reengage the clutch as the needle 206 matches the position of 302a. In the second state, a gear target shift point indicator 302 may have comparatively increased saliency in comparison with the first state. For example, the brightness/intensity level of the first gear target shift point indicator 302a may be increased from a duller level provided in the first state to a brighter or more intense level in the second state. As shown in FIG. 4, the measured engine speed is additionally within the target engine speed range as indicated by the display state of the target engine speed range indicator 210 (e.g., in the second state).

With reference to FIG. 5, the gear target shift point indicators 302 are dynamically removed from display in the dynamic tachometer 106. For example, the driver may have performed a shift to a lower gear at the first gear target shift point, and the dynamic tachometer UI engine 104 may be recalculating new gear target shift points based on the new gear and road speed of the vehicle 102.

With reference to FIG. 6, the gear target shift point indicators 302 are dynamically redisplayed at recalculated gear target shift points. Additionally, the measured engine speed continues to be within the target engine speed range as indicated by the display state of the target engine speed range indicator 210 (e.g., in the second state).

Figure 7:
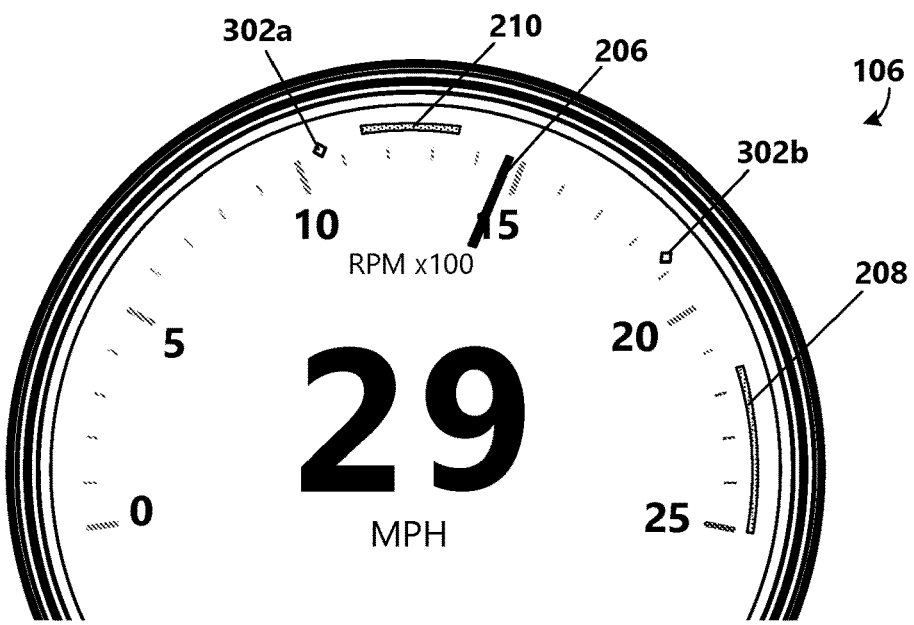
FIG. 7 is an illustration of the example dynamic tachometer display of FIG. 6, wherein the positions of the target gear shift point indicators are updated as the vehicle's road speed changes and the indication that the vehicle's engine speed is within the target engine speed range is deactivated.

With reference to FIG. 7, locations of the gear target shift point indicators 302 are dynamically updated based on recalculated gear target shift points. Additionally, the display state of the target engine speed range indicator 210 is updated to the first state based on the measured engine speed being outside of the target engine speed range.

Figure 8:
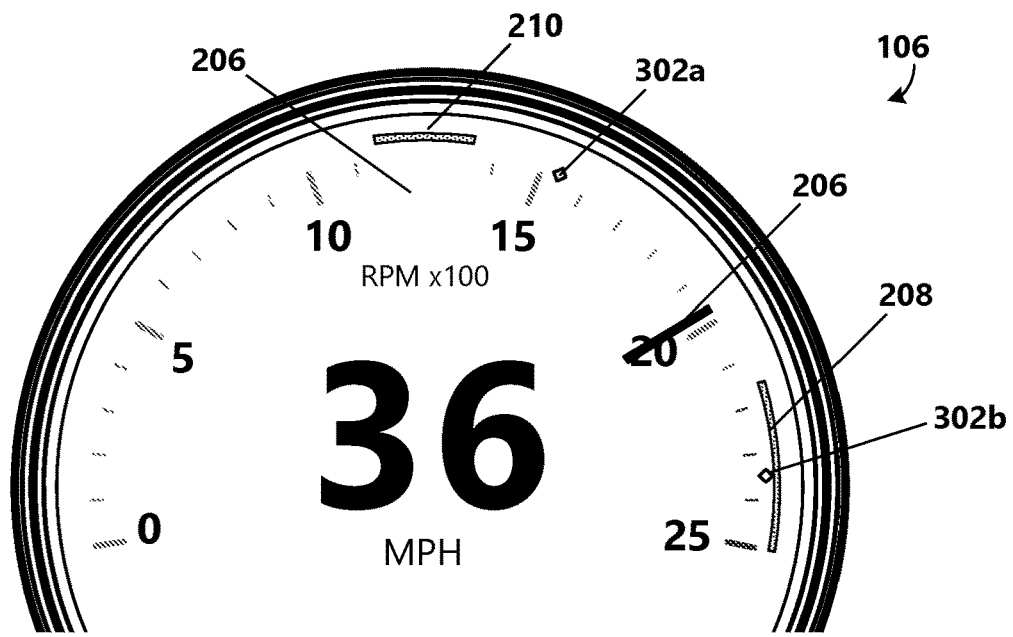
FIG. 8 is an illustration of the example dynamic tachometer display of FIG. 7, wherein the positions of the target gear shift point indicators are updated as the vehicle's road speed changes.

With reference to FIG. 8, locations of the gear target shift point indicators 302 are further dynamically updated based on recalculated gear target shift points. In some examples and as shown in FIG. 8, a gear target shift point may be in the overspeed range as indicated by the location of the second gear target shift point indicator 302b in relation to the overspeed range indicator 208. As can be appreciated, this may provide feedback to the driver that can inform the driver whether a particular shift would put the engine speed into the overspeed range or below the torque curve.

With reference to FIG. 9, locations of the gear target shift point indicators 302 are further dynamically updated based on recalculated gear target shift points. Additionally, the display state of the overspeed range indicator 208 is dynamically updated and displayed in the second state to provide a first level warning to alert the driver that the measured engine speed is approaching the overspeed range.

With reference to FIG. 10, the location of the first gear target shift point indicator 302a is further dynamically updated based on a recalculated gear target shift point. In some examples and as shown in FIG. 10, the second gear target shift point indicator 302b may be removed from display in relation to the dynamic tachometer 106 when the associated target shift point is outside limits of the tachometer scale 202. Additionally, the display state of the overspeed range indicator 208 is dynamically updated and displayed in the third state to provide a critical level warning to alert the driver that the measured engine speed is in the overspeed range where engine damage may occur.

According to an aspect, the dynamic tachometer 106 may be further dynamically modified to provide PTO-related information to the vehicle driver. For example, the vehicle 102 may be configured for PTO operation, where power from the vehicle's engine can be transmitted to an application, such as an ancillary vehicle component, attached implement, or separate machine. Some non-limiting examples of PTOs include a dump truck bed, a towing winch, a compactor, a boom/grapple, a water pump, a water extraction machine, etc. PTO controls may be provided in the vehicle's cab and/or remotely located on the vehicle body, on an attached implement, etc. According to an aspect, the vehicle 102 may be further configured to provide a PTO mode where engine speed controls and configurable interlocks may be applied for PTO usage. The engine PTO controls may be flexible with various customizable features, which allow for configurations to meet the needs of a variety of vehicle applications. According to an aspect, PTO mode may comprise PTO mode control (PMC) features and PTO speed control (PSC) features. In some examples, PMC functionality may be enabled and activated by actuation of a switch or based on feedback of PTO engagement. In some examples, when a PTO switch is actuated to an on position, if the associated PTO device is mechanically engaged and if particular interlock conditions are met, the engine may enter into PTO mode automatically and PSC features (e.g., engine software used in PTO mode to control engine speed) may be employed to adjust engine speed to a PTO mode minimum engine speed or to a preset operating engine speed. For example, when a PTO mode is engaged and PMC is activated, various limitations can be imposed by software in the engine controller, such as, but not limited to, engine speed, engine speed ramp-up/ramp-down rates, maximum engine torque output, vehicle road speed, engine idle time, safety interlocks, etc. These special engine controls, logic, limits, and interlocks assist with PTO operation.

Figure 11A:
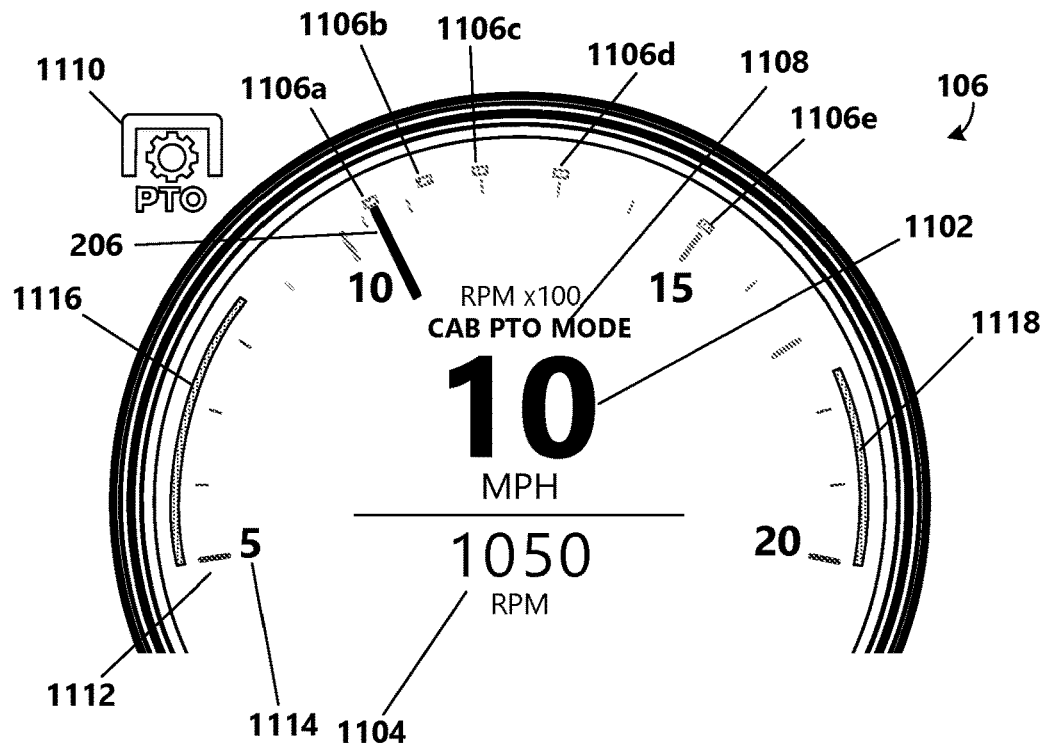
FIG. 11A is an illustration of an example dynamic tachometer display including an indication that a power takeoff mode is enabled, a power takeoff engine speed scale, and an indication of power takeoff mode preset engine speed values.
Figure 11B:
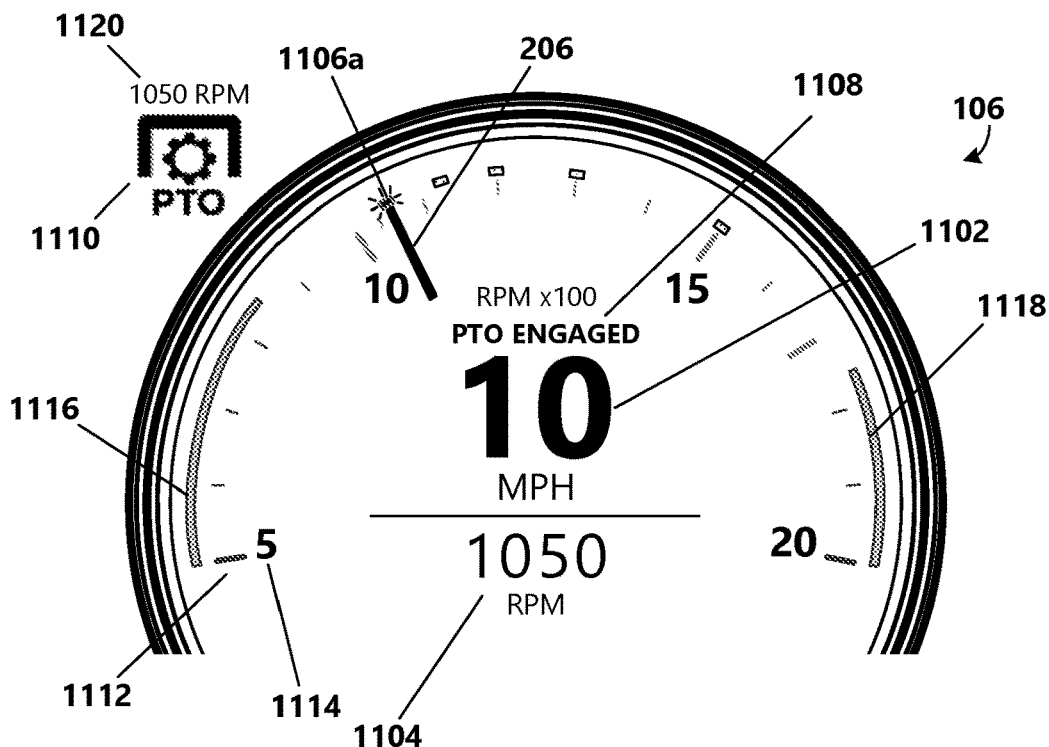
FIG. 11B is an illustration of the example dynamic tachometer display of FIG. 11A, including an indication that a power takeoff mode is activated and an indication that the vehicle's engine speed is within a threshold of a preset engine speed value associated with the activated power takeoff mode.
Figure 12A:
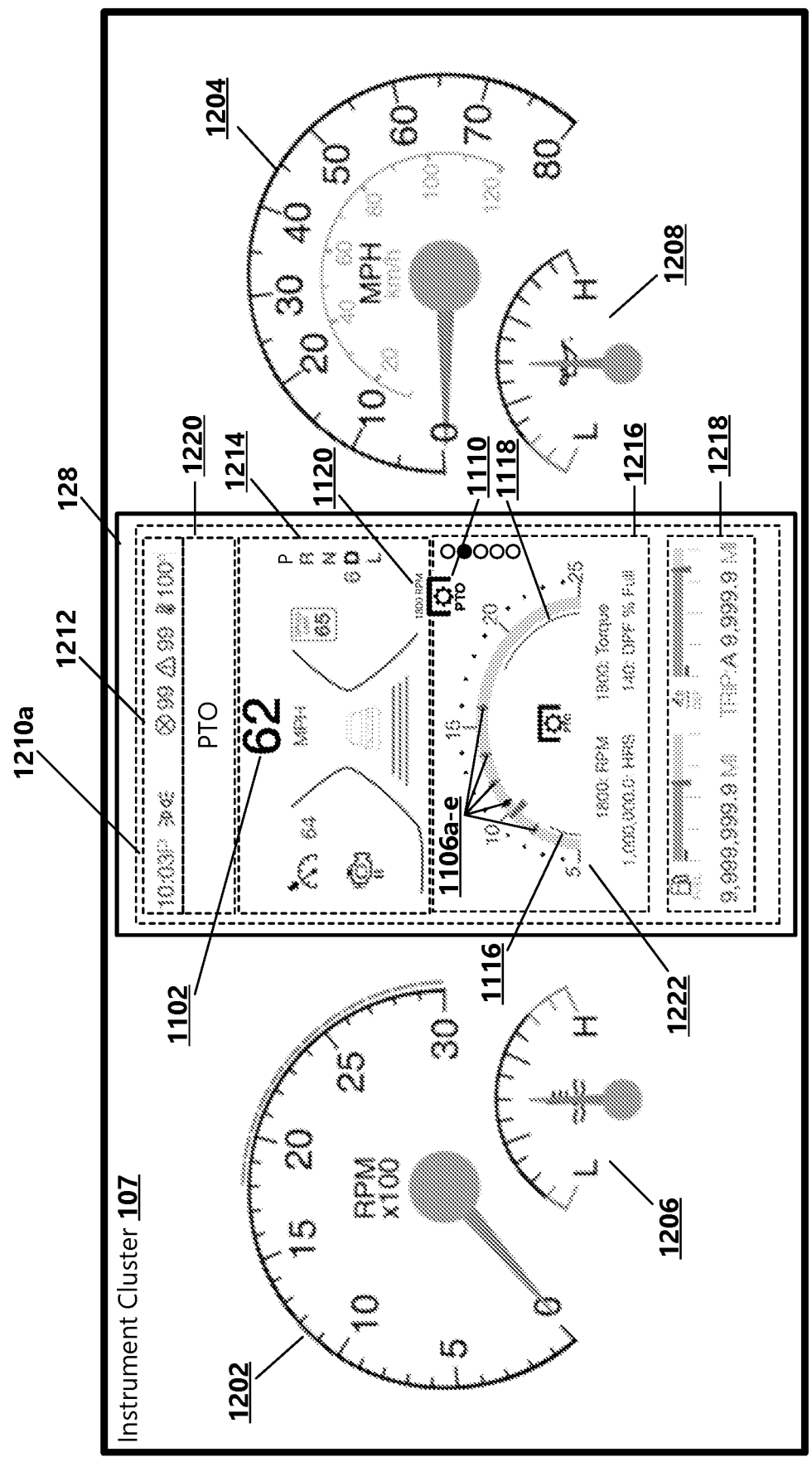
FIG. 12A is an illustration of an example dynamic tachometer display embodied as a power takeoff digital tachometer shown on a power takeoff card.
Figure 12B:
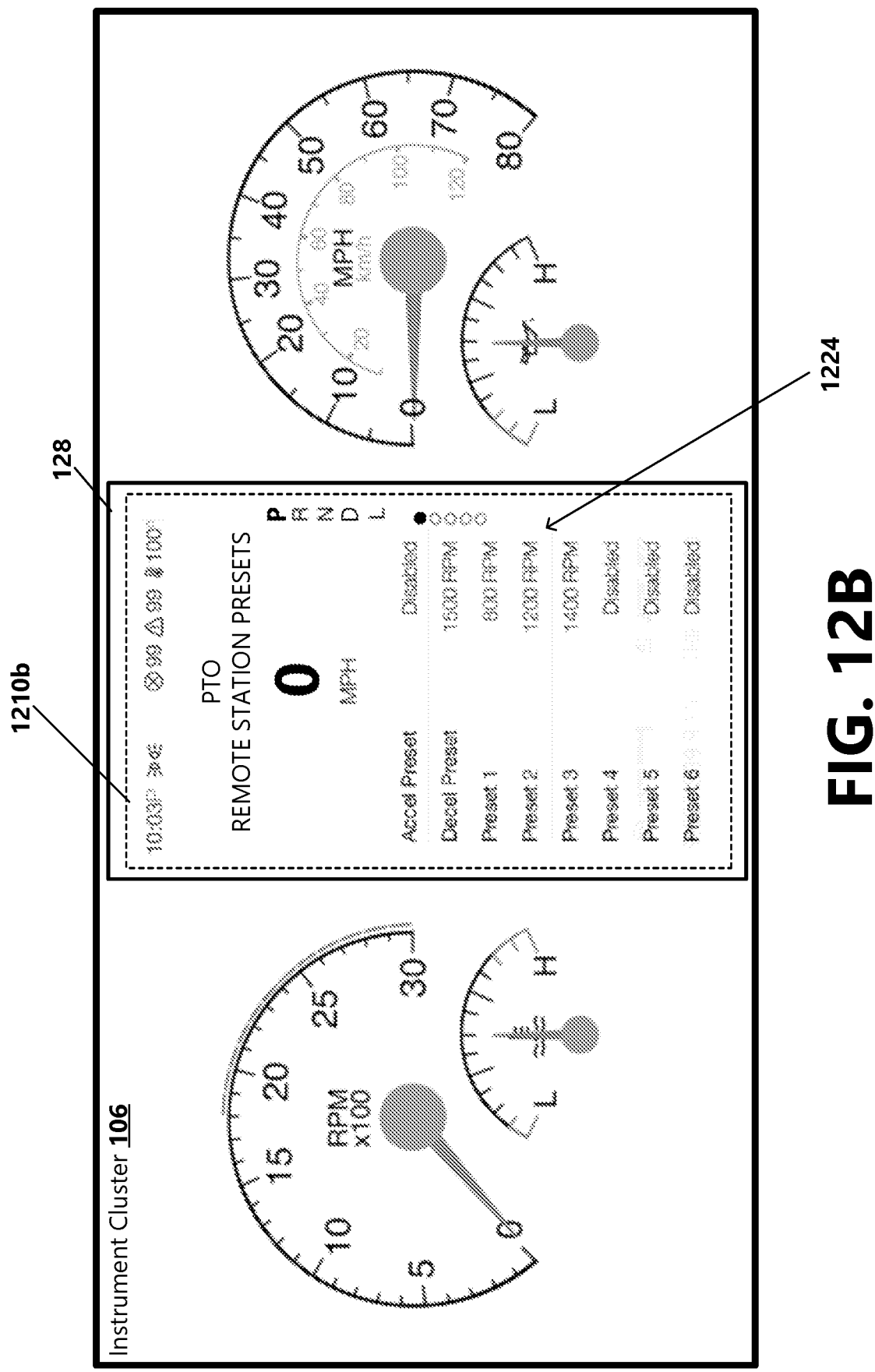
FIG. 12B is an illustration of an example card including a listing of power takeoff preset values.

According to an example aspect, when a PTO mode is enabled or active/engaged, the dynamic tachometer 106 may be dynamically transformed to improve driver situational awareness associated with the state of stationary or non-stationary PTO operation and various aspects of a specific PTO's range limits or pre-set pre-determined operating engine speeds. FIGS. 11A and 11B show one example implementation of providing PTO-related information via an instrument cluster 107, and FIG. 12A shows another example implementation of providing PTO-related information via another embodiment of an instrument cluster 107.

In some examples, when a PTO mode is enabled or active/engaged, the dynamic tachometer 106 may be dynamically transformed to display the vehicle's road speed (MPH/KPH) and engine speed (RPM) as digital readouts 1102 (road speed), 1104 (engine speed) as shown in the examples illustrated in FIGS. 11A and 11B. For example, the digital readouts 1102, 1104 of the vehicle's road speed and engine speed may be provided as a transitional display element to inform the driver that PTO mode is enabled or active. Additionally, the digital readouts 1102, 1104 may also provide another form of communication of what the current vehicle and engine speeds are.

In some examples, when PMC is active, the dynamic tachometer 106 may be dynamically transformed to display a PTO text indication 1108 specifying the type of PTO mode in use (e.g., a cab PTO mode, a remote PTO mode, a cab pump mode, or a remote pump mode). For example, in the example illustrated in FIG. 11A, the dynamic tachometer 106 is dynamically updated such that the PTO text indication 1108 specifies that the cab PTO mode is enabled. In some examples, when the vehicle 102 is configured with PSC and when PSC is active, the PTO text indication 1108 may be updated to indicate that PTO is engaged as shown in FIG. 11B.

In some examples, when PSC is enabled, a PTO telltale indicator 1110 may be displayed in relation to the dynamic tachometer 106. When PSC is enabled, the PTO telltale indicator 1110 may be displayed in a first state, wherein the PTO telltale indicator 1110 may be displayed in a particular color (e.g., white) as indicated by the outlined icon illustrated in FIG. 11A. In some examples, when PSC is active, the PTO telltale indictor 1110 may be displayed in a second sate, wherein the PTO telltale indicator 1110 may be displayed in a different color (e.g., green) as indicated by the filled icon illustrated in FIG. 11B. In some examples, when PSC is active, the dynamic tachometer 106 may further include a display of a PTO target engine speed readout 1120, such as shown in FIG. 11B above the PTO telltale indicator 1110. For example, the PTO target engine speed readout 1120 may inform the driver of an intended target RPM engine speed when PSC is active.

In some examples, when PSC is enabled or active and when PTO mode preset values are defined, the dynamic tachometer 106 may be further dynamically updated to display one or more PTO mode preset indicators 1106a-e (generally 1106) corresponding to one or more PTO preset values. For example, various engine speed points and associated upper and lower operation limit values may be programmed into the vehicle 102 and stored as PTO mode preset values specific to a particular PTO engagement switch. The number of PTO mode preset indicators 1106 displayed may correspond with a number of PTO modes for which preset operating values have been previously defined and may be coupled to one or more PTO engagement switches. Although five PTO mode preset indicators 1106 are shown in FIGS. 11A and 11B, fewer or more PTO mode preset indicators 1106 may be displayed.

The PTO mode preset indicators 1106 may be provided to inform the driver of the programmable engine speed presets that may be enabled when the vehicle 102 has a PTO mode enabled. A PTO mode preset indicator 1106 may be located in relation to a preset engine speed point (value) and may be displayed in one of two states: a first state when PSC is enabled and a second state when PSC is active and the preset engine speed point associated the preset indicator is engaged. For example and with reference to FIG. 11B, a PTO mode preset indicator 1106a is shown displayed with increased saliency than shown in FIG. 11A when PSC is active for a PTO. In some examples and as shown in FIGS. 11A and 11B, the target engine speed range indicator 210 may be removed from display in the dynamic tachometer 106 when PTO mode preset indicators 1106 are displayed.

In some examples, when in PTO mode and PMC is active, the dynamic tachometer 106 may transition to be displayed in a PTO state including a PTO scale 1112, a PTO underspeed range limit 1116, and a PTO overspeed range limit 1118. For example, when a PTO is engaged, the full scale 202 of the tachometer may be transformed to the PTO scale 1112. For example, during normal vehicle operation where a PTO is not being used, the tachometer scale 202 may include numerical identifiers 204 ranging from 0 RPM to the full scale redline (i.e., upper limit of the overspeed range). As shown with respect to the examples illustrated in FIGS. 11A and 11B, during PTO engagement, the tachometer scale 202 and numerical identifiers 204 may be dynamically modified from the full scale to the PTO scale 1112, wherein the numerical identifiers 1114 may be updated such that they correspond with usable engine speed bounds for PTO operation (e.g., a range of 5-2000 RPM). The transition to the PTO scale 1112 and the operational limits (e.g., PTO underspeed range limit 1116 and PTO overspeed range limit 1118) may help to inform the driver of an active PMC and may allow the driver to visualize the (settable) upper and lower range limits 1116, 1118. Additionally, dynamically modifying the dynamic tachometer 106 based on PTO usage may help to increase discernment of needle 206 readings as resolution of the tachometer 106 may be increased due to reducing the range of the scale within the same scale space on the display.

In some examples and with reference now to FIGS. 12A, a vehicle's instrument cluster 107 may comprise a combination of physical gauges and a digital display of information on a display screen 128. According to one example, the physical gauges may include a tachometer 1202, a speedometer 1204, an engine coolant temperature gauge 1206, and an oil pressure gauge 1208, and the digital display may include a display of a plurality of display screens, sometimes referred to herein as cards 1210. In other examples, one or more of the tachometer 1202, speedometer 1204, engine coolant temperature gauge 1206, and oil pressure gauge 1208 may be embodied as digital displays.

A card 1210 may include various display zones. In one example, a card 1210 may include a header or top bar 1212, a vehicle mode content zone 1214, a dynamic content zone 1216, and a footer or bottom bar 1218. For example, the top bar 1212 may include a set of persistent content horizontally across the top of the screen 128. The vehicle mode content zone 1214 may include content specific to the vehicle's current mode (e.g., drive versus park) and state (e.g., active versus inactive). In some examples, the vehicle mode content zone 1214 may include a digital speedometer 1102, cruise control functions, engine brake information, an ADAS zone, and a plurality of digital telltale slots. In some examples, when a determination is made to provide a popup notification, the popup notification may be displayed in a notifications zone 1220 located in a top portion of the vehicle mode content zone 1214. For example, the notifications zone 1220 may be in a location central to the driver's field of vision on the instrument cluster 107. The vehicle mode content zone 1214 may include specific content unique to the card 1210, which may include gauges, custom setup options, ADAS features, TPMS, menu options, and/or trip information. The bottom bar 1218 may include vehicle-specific fuel gauge configurations.

In some examples, when PTO control is configured on a vehicle 102, a PTO display card 1210a may be available. An example PTO display card 1210a is illustrated in FIG. 12A. When a signal is received of an active PTO mode, the PTO card 1210a may be inserted in place of a previously shown card and inserted in a pagination sequence above the previously shown card. The PTO card 1210a may be associated with the active PTO status (PTO engine operating mode). In some examples, the PTO mode may be triggered by actuation of a cab control (e.g., a dash switch), a remote control (e.g., switch, other controller, CAN controllers, etc.) not located in the cab, or by another means.

According to an aspect, the dynamic tachometer UI engine 104 may comprise logic rules and layout rules that may be used to select inclusion and placement of information in the dynamic content zone 1216. In some examples and as illustrated in FIG. 12A, the PTO card 1210a may include various PTO-related information, such as a PTO digital tachometer 1222, a PTO RPM digital readout, PTO engine hours, engine torque, diesel particulate filter (DPF) status, etc. For example, the PTO digital tachometer 1222 may be displayed in a PTO state including the PTO scale 1112 and operational engine speed limits (e.g., the PTO underspeed range limit 1116 and the PTO overspeed range limit 1118). When the driver increases or decreases the vehicle's engine speed, a digitally displayed needle of the PTO digital tachometer 1222 may react similarly to the needle of a traditional mechanical gauge tachometer.

In some examples, the vehicle's engine may be configured with one or more modifiable preset speeds, and the PTO digital tachometer 1122 may include one or more PTO mode preset indicators 1106 corresponding to the one or more enabled/defined PTO preset engine speed values. When PSC is enabled and the vehicle's engine speed matches a preset value, the corresponding PTO mode preset indicator 1106 may be displayed as active (e.g., displayed with increased saliency). In some examples, various menu cards 1210 may be provided that enable the driver to view various PTO information. For example and with reference to FIG. 12B a PTO presets card 1210b may be displayed that includes a display of one or more of defined PTO preset engine speed values 1224. The example illustrated in FIG. 12B includes a display of remote station preset values. However, in other examples, the PTO presets card 1210b may additionally or alternatively include a display of cab station preset values. As should be appreciated, the above example dynamic tachometer 106 and instrument cluster 107 UIs are intended to be exemplary and not limiting. Other types and configurations of visualizations are possible and are within the scope of the present disclosure.

Figure 13:
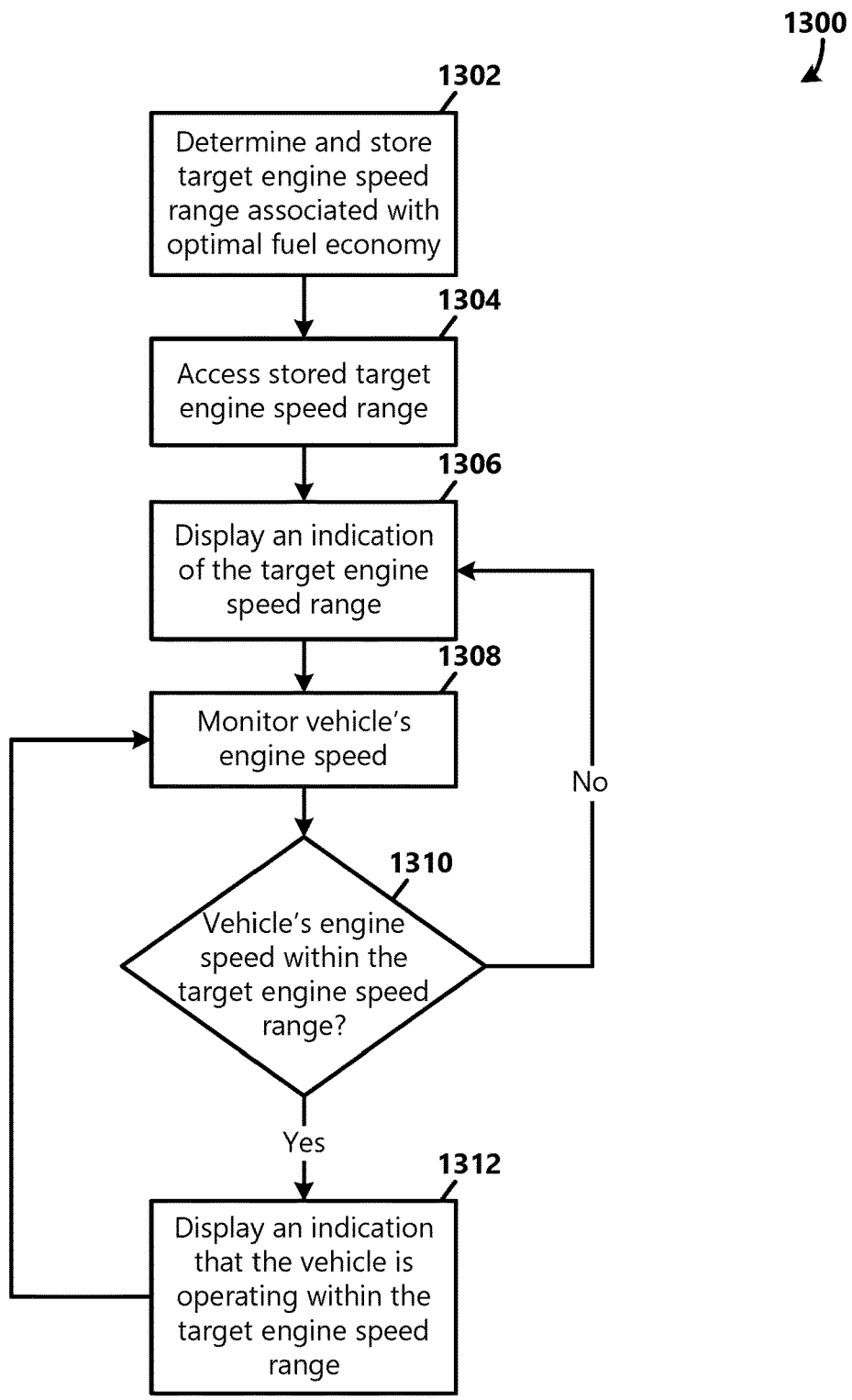
FIG. 13 is a flow diagram depicting general stages of an example process for providing a display of an indication of the vehicle's target engine speed range to optimize fuel economy and an indication that the vehicle's target engine speed is within the target engine speed range.

FIG. 13 is a flow diagram depicting general stages of an example method 1300 for providing a display of an indication of the vehicle's target engine speed range to optimize fuel economy and an indication when the vehicle's target engine speed is within the target engine speed range. At OPERATION 1302, a target engine speed range for a vehicle 102 may be determined, wherein the target engine speed range includes an engine speed and a threshold at which the vehicle 102 is determined to run most efficiently with respect to fuel economy. In some examples, the target engine speed range may be determined and specified by a manufacturer of the vehicle's engine. In other examples, the target engine speed range may be determined for the vehicle 102 based on an analysis of actual engine speed and fuel usage data. The target engine speed range may be stored as a setting in memory.

The target engine speed range may be accessed by the dynamic tachometer UI engine 104 at OPERATION 1304. At OPERATION 1306, an indication of the target engine speed range (i.e., target engine speed range indicator 210) may be displayed in relation to a dynamic tachometer 106 included in a vehicle 102 for providing engine speed-related information to the driver of the vehicle. In some examples, the dynamic tachometer 106 includes a display of LEDs to convey engine speed-related information (e.g., in relation to a mechanical tachometer. In other examples, the dynamic tachometer 106 includes a display of a tachometer and engine speed-related information on a display screen. In some examples, the target engine speed range indicator 210 may be displayed when certain conditions are met, such as when the vehicle's transmission is in a park mode or a drive mode and when the PTO mode is disabled and when the vehicle's measured road speed is within a cruise speed threshold. According to another aspect, the target engine speed range indicator 210 may be displayed in a first state as an educational indication of the target engine speed range. For example, the display of the target engine speed range indicator 210 may be indicative of the associated RPM values included in the target engine speed range. Examples of the target engine speed range indicator 210 being displayed in the first state are shown in FIGS. 2, 3, and 7-9.

At OPERATION 1308, the vehicle's engine speed may be monitored based on engine speed data collected from the vehicle information data source 118. At DECISION OPERATION 1310, a determination may be made as to whether the vehicle's engine speed is within the target engine speed range. If the vehicle's engine speed is not within the target engine speed range, the method 1300 may return to OPERATION 1306, where the target engine speed range indicator 210 continues to be displayed in the first state. When a determination is made that the vehicle's engine speed is within the target engine speed range at DECISION OPERATION 1310, the method 1300 may proceed to OPERATION 1312, where the target engine speed range indicator 210 is transformed to indicate that the current engine speed of the vehicle 102 is within the bounds of the target engine speed range. For example, the target engine speed range indicator 210 may be transformed to be displayed in the second state, where saliency of the indicator is increased. Examples of the target engine speed range indicator 210 being displayed in the second state are shown in FIGS. 4-6. In some examples, information associated with whether the vehicle 102 is operating within the target engine speed range may be recorded. The method 1300 may return to OPERATION 1308, where the vehicle's engine speed may continue to be monitored. In some examples, the target engine speed range indicator 210 may continue to be displayed in the second state based as long as the measured engine speed is within the bounds of the target engine speed range and as long as the conditions (e.g., vehicle's transmission is in a park mode or a drive mode, when the PTO mode is disabled, and when the vehicle's measured road speed is within a cruise speed threshold) continue to be met.

Figure 14:
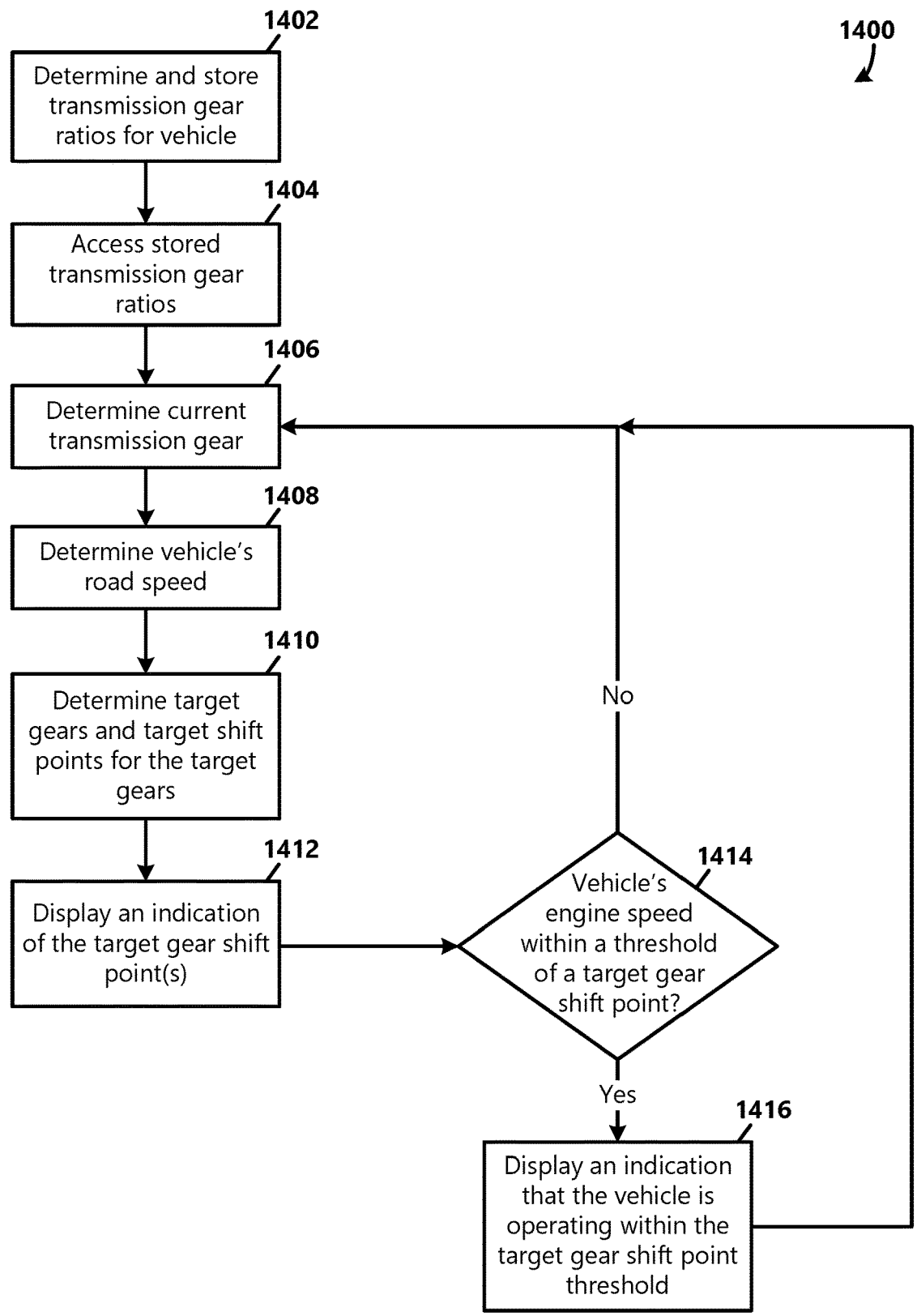
FIG. 14 is a flow diagram depicting general stages of an example process for determining target gear shift points, and providing a display of an indication of the target gear shift points and an indication that the vehicle's target engine speed is within a threshold of a target gear shift point.

FIG. 14 is a flow diagram depicting general stages of an example method 1400 for determining target gear shift points, and providing a display of an indication of the target gear shift points and an indication that the vehicle's target engine speed is within a threshold of a target gear shift point. At OPERATION 1402, transmission gear ratios may be determined for the vehicle 102 and stored as vehicle configuration settings. For example, the transmission gear ratios may be calculated based on various vehicle configuration variables (e.g., engine configuration, transmission configuration, rear end axle differential ratio, tire height).

The transmission gear ratios may be accessed by the dynamic tachometer UI engine 104 at OPERATION 1404. At OPERATION 1406, transmission state data may be accessed and used to determine a current gear in which the vehicle 102 is operating. At OPERATION 1408, road speed data may be accessed and used to determine the vehicle's current road speed.

At OPERATION 1410, target gears and associated target shift points may be determined based on the gear ratios, the gear the transmission is operating in, and the vehicle's current road speed. For example, the target gears may be gears that the transmission can be shifted into from the current gear, and the associated target shift points may be engine speeds at which the shift can be made to the gear.

At OPERATION 1412, the dynamic tachometer 106 may be transformed to display one or more target shift point indicators 302 in relation to the RPMs of the determined target shift points. In some examples, a gear target shift point indicator 302 may include an indication of the gear associated with the target shift point/target RPM. In other examples, gear target shift point indicators 302 may further inform the driver of an RPM range the tachometer needle 206 may reside in responsive to an up or down shift. According to an aspect, when the vehicle's measured engine speed is outside the threshold of the associated target shift point, the one or more target shift point indicators 302 may be displayed in a first state as educational indications of the gear target shift points.

At DECISION OPERATION 1414, a determination may be made as to whether the vehicle's measured engine speed is within a threshold of a gear target shift point. When a determination is made that the vehicle's measured engine speed is not within a threshold of a gear target shift point, the method 1400 may return to OPERATION 1406, where data are collected (OPERATIONS 1406,1408) for re-determining target gears and recalculating target shift points based on the current gear and road speed variables (OPERATION 1410) and updating the dynamic tachometer 106 accordingly (OPERATION 1412).

When a determination is made that the vehicle's measured engine speed is within a threshold of a gear target shift point at DECISION OPERATION 1414, the method 1400 may proceed to OPERATION 1416, where the dynamic tachometer 106 may be updated and the associated target shift point indicator 302 may be transformed to indicate that the current engine speed of the vehicle 102 is within the threshold of the gear target shift point. For example, the associated target shift point indicator 302 may be transformed to be displayed in the second state, where saliency of the indicator is increased as an indication that the vehicle's engine speed is within a shift point threshold where smooth engagement with an associated gear can be accomplished. As can be appreciated, display of target shift point indicators 302 and display of an indication that a shift can be made at a particular time based on variable conditions can help educate a driver on the vehicle's shift points. As can be further appreciated, feedback provided via the target shift point indicators 302 can be particularly advantageous for helping a driver to understand how to shift when using a non-synchromesh transmission requiring double clutching. The method 1400 may return to OPERATION 1406, where data are collected (OPERATIONS 1406,1408) for re-determining target gears and recalculating target shift points based on the current gear and road speed variables (OPERATION 1410) and updating the dynamic tachometer 106 accordingly (OPERATION 1412).

Figure 15:
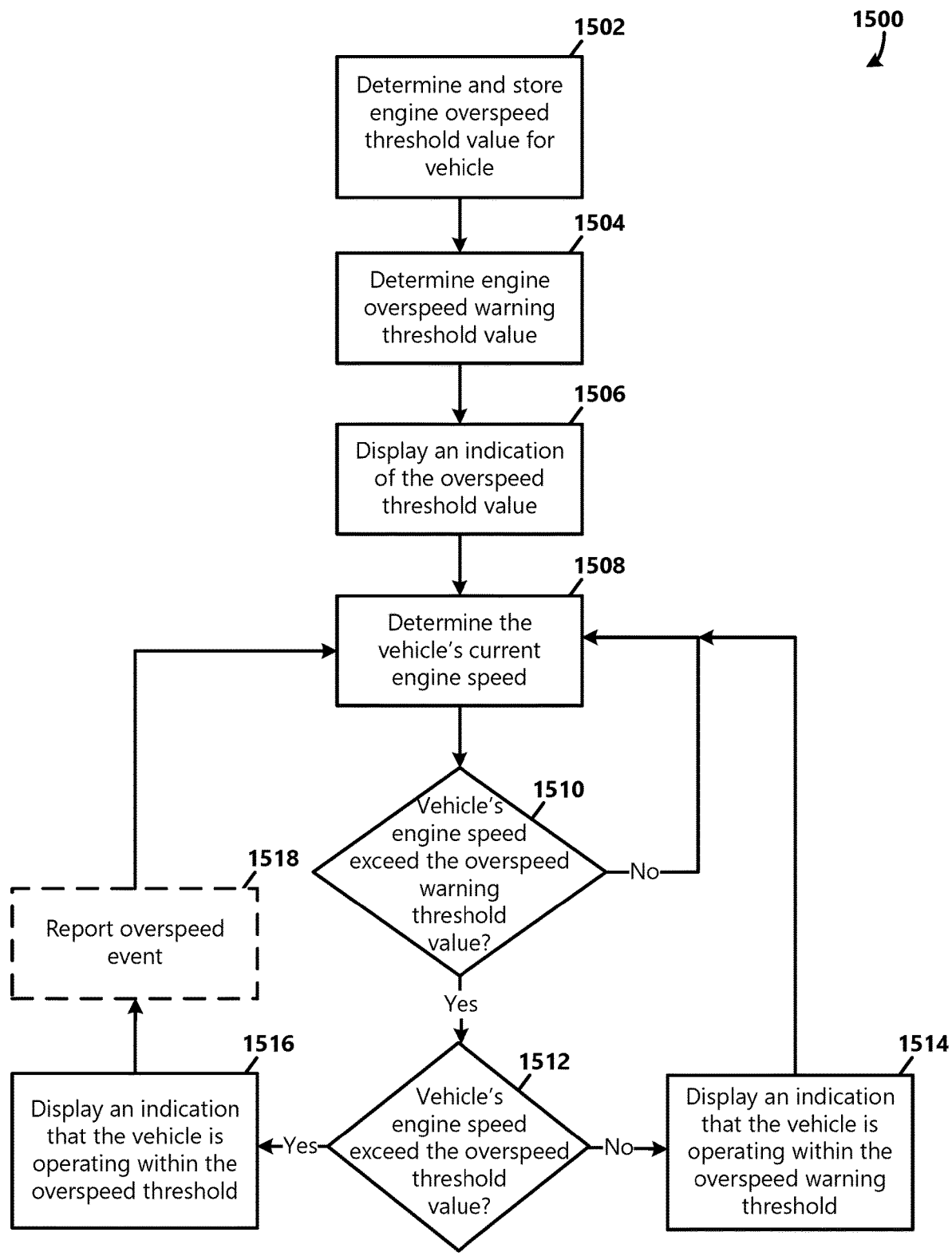
FIG. 15 is a flow diagram depicting general stages of an example process for providing a display of an indication of the vehicle's engine overspeed threshold value, an indication that the vehicle's target engine speed exceeds the engine overspeed warning threshold value, and an indication that the vehicle's target engine speed exceeds the engine overspeed threshold value.

FIG. 15 is a flow diagram depicting general stages of an example method 1500 for providing a display of an indication of the vehicle's engine overspeed threshold value, an indication that the vehicle's target engine speed exceeds the engine overspeed warning threshold value, and an indication that the vehicle's target engine speed exceeds the engine overspeed threshold value. At OPERATION 1502, an overspeed range for the vehicle 102 may be determined and stored as vehicle configuration settings. For example, the overspeed range may be a maximum engine speed specified by a manufacturer of the vehicle's engine and based on the configuration of the engine.

At OPERATION 1504, an overspeed warning threshold may be determined and stored as a setting. For example, the overspeed warning threshold may represent a range in which an alert may be provided to the driver that the engine speed of the vehicle 102 is approaching the overspeed range where engine damage may occur. In some examples, the warning threshold range may have a starting value that is 100 RPM from the starting value of the overspeed range.

At OPERATION 1506, the overspeed range indicator 208 may be displayed in a first state in relation to the RPMs of the overspeed range on the dynamic tachometer 106 to inform the driver of the overspeed range. Examples of the overspeed range indicator 208 being displayed in the first state are shown in FIGS. 2-8. At OPERATION 1508, the vehicle's current engine speed may be determined based on engine speed data provided by the vehicle information source 118, and at DECISION OPERATION 1510, a determination may be made as to whether the vehicle's measured engine speed meets or exceeds an overspeed warning threshold value (e.g., the starting value of the warning threshold range). When the vehicle's measured engine speed does not meet or exceed the overspeed warning threshold value, the method 1500 may return to OPERATION 1508, where the overspeed range indicator 208 may continue to be displayed in the first state and the vehicle's engine speed may be monitored.

When the vehicle's measured engine speed meets or exceeds the overspeed warning threshold value, the method 1500 may proceed to DECISION OPERATION 1512, where a determination may be made as to whether the vehicle's measured engine speed meets or exceeds a starting value of the overspeed range. When the vehicle's measured engine speed does not meet or exceed the starting overspeed threshold value, the method 1500 may proceed to OPERATION 1514, where the overspeed range indicator 208 may be dynamically transitioned to be displayed in the second state (example shown in FIG. 9), where the level of salience is increased to provide the driver with a subtle warning that the vehicle 102 is approaching the limit point of the engine's rotational speed. In some examples, in the second state, the line weight and the brightness level of the overspeed range indicator 208 may be increased from the first state. For example, the warning may alert the driver to make an adjustment in acceleration or gear selection to avoid further escalation of the engine speed into the overspeed range. The method 1500 may return to OPERATION 1508, where the engine speed may be monitored.

When the vehicle's measured engine speed meets or exceeds the starting overspeed threshold value at DECISION OPERATION 1512, the method 1500 may proceed to OPERATION 1516, where the overspeed range indicator 208 may be dynamically transitioned to be displayed in the third state (example shown in FIG. 10), where the level of salience is increased to provide an obvious warning to the driver that the vehicle 102 has exceeded the overspeed limit and engine speed needs to be reduced immediately. In some examples, in the third state, the line weight and the brightness level of the overspeed range indicator 208 may be increased from the second state. In some examples, in the third state, the color of the needle 206 may be changed (e.g., from red to white). In some examples, for increased salience, the dynamic tachometer 106 may include a background glow 1002 during an overspeed event (i.e., when the engine speed is in the overspeed range). In further examples, for increased salience, an audible warning may be played.

At OPTIONAL OPERATION 1518, the overspeed event and associated information may be recorded and reported. For example, information about the overspeed event may be used to inspect the vehicle 102 for possible engine damage and/or as part of measuring driver performance, etc. The method 1500 may return to OPERATION 1508, where the engine speed may be monitored.

Figure 16:
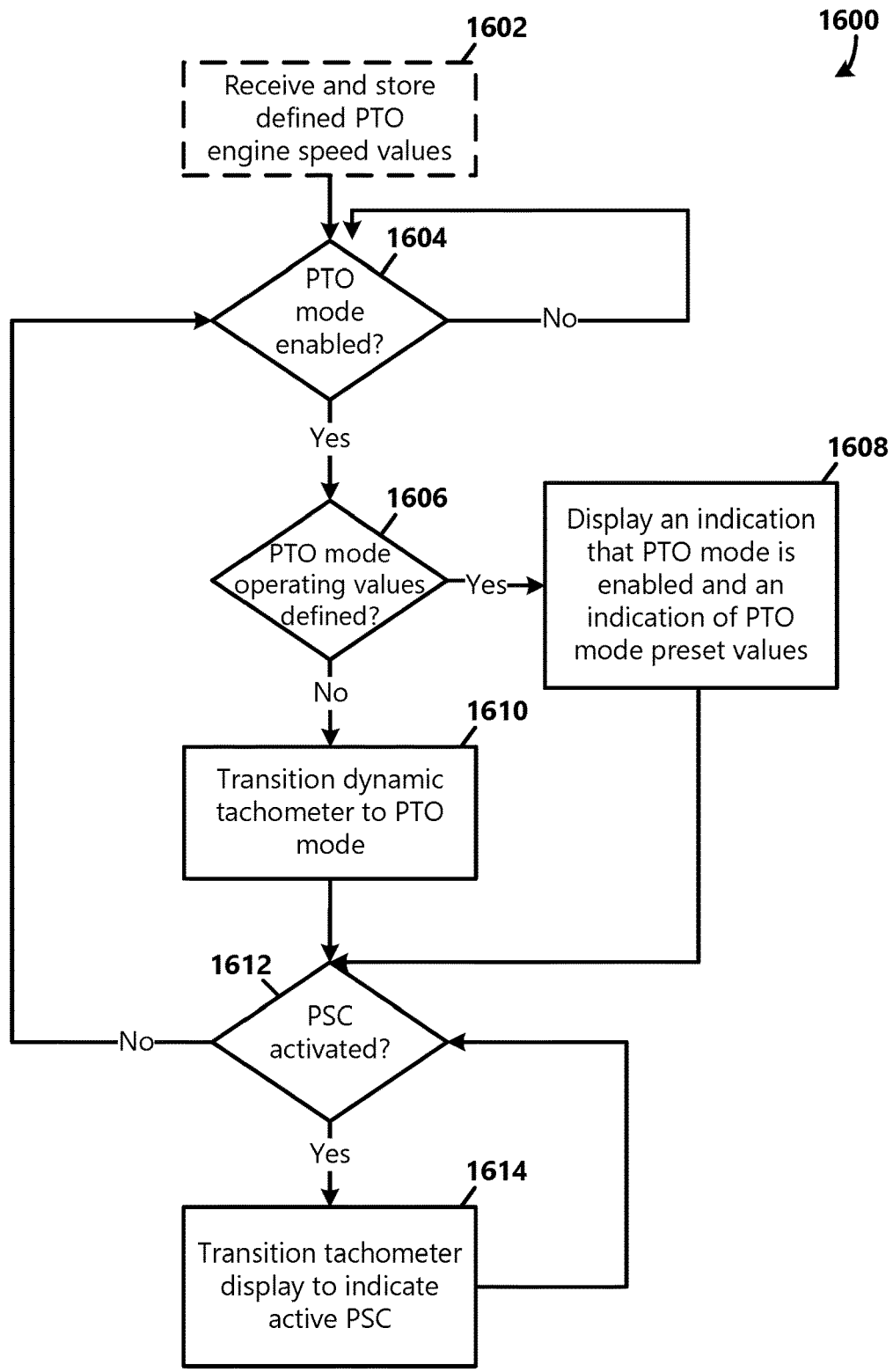
FIG. 16 is a flow diagram depicting general stages of an example process for providing a display of an indication that a power takeoff mode is enabled or activated, and for transitioning the tachometer display to include a power takeoff engine speed scale associated with power takeoff operation.

FIG. 16 is a flow diagram depicting general stages of an example method 1600 for providing a display of an indication that a PTO mode is enabled or activated, and for transitioning the dynamic tachometer 106 display to include a PTO engine speed scale 1112 associated with PTO operation. At OPTIONAL OPERATION 1602, engine speed values (and in some examples, additional values and settings) associated with operation of a PTO may be input and stored as PTO mode preset values. For example, the PTO mode preset values may define upper and lower operation limit values specific to a particular PTO device and/or PTO device function.

At DECISION OPERATION 1604, a determination may be made as to whether a PTO mode is enabled. In some examples, the determination may be made as to whether a PTO mode switch is actuated by a user (e.g., a driver or other operator) and is in an enabled/on state. When a determination is made that a PTO mode is not enabled, the method 1600 may loop back to DECISION OPERATION 1604 to monitor for actuation of a PTO mode. When a determination is made that a PTO mode is enabled at DECISION OPERATION 1604, the method 1600 may proceed to DECISION OPERATION 1606, where a determination may be made as to whether one or more PTO mode preset values are stored. If a determination is made that one or more PTO mode preset values are stored, the method 1600 may proceed to OPERATION 1608, where the dynamic tachometer 106 may be dynamically modified to provide an indication the associated PTO mode is enabled and to include a display of one or more PTO mode preset indicators 1106 corresponding to one or more PTO preset engine speed values that may be enabled when the vehicle 102 has a PTO mode enabled. If a determination is made that no PTO mode preset values are stored at DECISION OPERATION 1606, the method 1600 may proceed to OPERATION 1610, where the dynamic tachometer 106 may be dynamically modified to provide an indication the associated PTO mode is enabled.

For example and as shown in FIG. 11, at OPERATION 1608 OR 1610, the dynamic tachometer 106 may be transformed to include the vehicle road speed and the vehicle engine speed displayed as digital readouts 1102,1104, a PTO text indication 1108 specifying the type of PTO mode enabled (e.g., a cab PTO mode, a remote PTO mode, a cab pump mode, or a remote pump mode), and a PTO underspeed range limit 1116 and a PTO overspeed range limit 1118 displayed in relation to a PTO scale 1112 that may be modified from a normal state to a PTO state where the usable engine speed bounds for PTO operation may be displayed. For example, limiting the tachometer scale to display the usable engine speed bounds for PTO operation may allow for an increased display resolution within the same scale space on the display, which may help to improve discernment between needle 206 readings and can help to increase driver understanding of PTO operation. In some examples, if PSC (PTO speed control) is enabled, a PTO telltale indicator 1110 may be displayed in a first state in relation to the dynamic tachometer 106. For example, PSC features may be used to adjust engine speed to a PTO mode minimum engine speed or to a preset operating engine speed.

At DECISION OPERATION 1612, a determination may be made as to whether PSC is active. When PSC is activated and the preset engine speed point associated the preset indicator is engaged, the method 1600 may proceed to OPERATION 1614, where the dynamic tachometer 106 may be dynamically modified to indicate the active PSC function. For example and as shown in FIG. 12, the PTO text indication 1108 may be updated to indicate that PTO is engaged, a PTO telltale indicator 1110 may be displayed in a second sate, wherein the PTO telltale indicator 1110 may be displayed in a different color (e.g., green) or with increased saliency, and/or a PTO target engine speed readout 1202 may be displayed to inform the driver of an intended target RPM engine speed when PSC is active. The method 1600 may return to DECISION OPERATION 1612. When a determination is made that PSC is not activated at DECISION OPERATION 1612, the method 1600 may return to DECISION OPERATION 1604.

Figure 17:
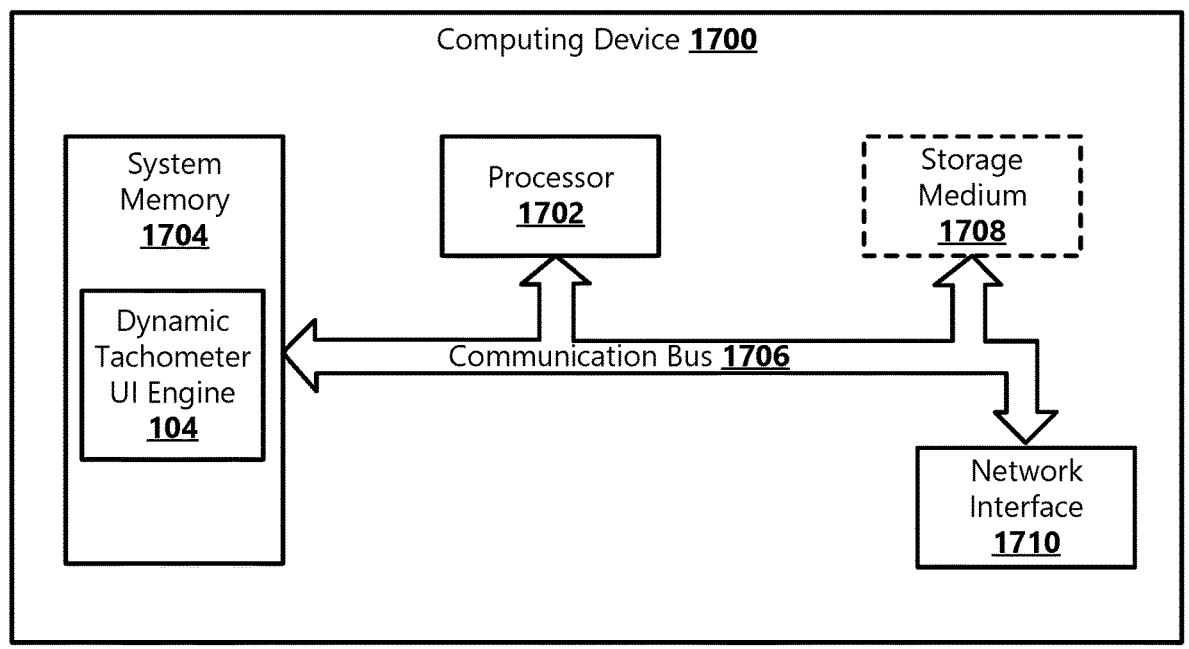
FIG. 17 is a block diagram of an example physical components of a computing device or system with which embodiments may be practiced.

FIG. 17 is a block diagram of an illustrative computing device 1700 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 1700 includes at least one processor 1702 and a system memory 1704 connected by a communication bus 1706. Depending on the exact configuration and type of device, the system memory 1704 may be volatile or nonvolatile memory, such as read-only memory ("ROM"), random access memory ("RAM"), EEPROM, flash memory, or other memory technology. Those of ordinary skill in the art and others will recognize that system memory 1704 typically stores data or program modules that are immediately accessible to or currently being operated on by the processor 1702. In some examples, system memory 1704 may store an application to perform elements of the present systems and methods, such as the dynamic tachometer UI engine 104. In this regard, the processor 1702 may serve as a computational center of the computing device 1700 by supporting the execution of instructions.

As further illustrated in FIG. 17, the computing device 1700 may include a network interface 1710 comprising one or more components for communicating with other devices over a network. Embodiments of the present disclosure may access basic services that utilize the network interface 1710 to perform communications using common network protocols. The network interface 1710 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 17, the computing device 1700 also includes a storage medium 1708. However, services may be accessed using a computing device that does not include means for persisting data to a local storage medium. Therefore, the storage medium 1708 depicted in FIG. 17 is optional. In any event, the storage medium 1708 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 1704 and storage medium 1708 depicted in FIG. 17 are examples of computer-readable media.

For ease of illustration and because it is not important for an understanding of the claimed subject matter, FIG. 17 does not show some of the typical components of many computing devices. In this regard, the computing device 1700 may include input devices, such as a keyboard, keypad, mouse, trackball, microphone, video camera, touchpad, touchscreen, electronic pen, stylus, or the like. Such input devices may be coupled to the computing device 1700 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 1700 (e.g., a client device), or can be integral components of the computing device 1700. In some embodiments, multiple input devices may be combined into a single, multifunction input device (e.g., a video camera with an integrated microphone). The computing device 1700 may also include output devices such as a display, speakers, printer, etc. The output devices may include video output devices such as a display or touchscreen. The output devices also may include audio output devices such as external speakers or earphones. The output devices can be separate from and communicatively coupled to the computing device 1700, or can be integral components of the computing device 1700. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C #, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A system for providing a dynamic tachometer, the system comprising:
    at least one processor;
    a memory storage device including instructions that, when executed by the at least one processor, cause the system to:
        display, via a digital tachometer, an indication of a current engine speed of a vehicle in relation to a range of normal operating mode engine rotation speeds; and
        in response to receiving an indication of actuation of a power takeoff (PTO), the instructions further cause the system to:
            update the digital tachometer to:
                replace the range of normal operating mode engine rotation speeds with a range of engine rotation speeds associated with PTO operation; and
                include a visual indication of upper and lower PTO operation engine speed limit values.

2. The system of claim 1, wherein the instructions further cause the system to:
    access a preset engine speed value associated with a PTO mode;
    display an indication of the preset engine speed value in a first state in relation to the range of engine rotation speeds associated with PTO operation; and
    when the PTO mode is engaged and PTO speed control is active, update the display of the indication of the preset engine speed value to a second state to indicate engagement of the PTO mode and activation of the PTO speed control.

3. The system of claim 2, wherein the instructions further cause the system to update the digital tachometer to include a visual indication of a type associated with the PTO mode.

4. The system of claim 2, wherein the PTO mode is selected from among a plurality of available PTO modes, each of the available PTO modes being associated with one or more present engine speed values.

5. The system of claim 4, wherein each of the available PTO modes is further associated with upper and lower PTO operation engine speed limit values.

6. The system of claim 1, wherein the indication of actuation of the power takeoff comprises at least one of actuation of a switch or feedback regarding mechanical engagement of the power takeoff.

7. The system of claim 1, wherein the instructions further cause the system to display a PTO display card including a PTO digital tachometer, a PTO RPM digital readout, PTO engine hours, engine torque, and diesel particulate filter (DPF) status.

8. The system of claim 1, wherein the instructions further cause the system to, while in a normal operating mode different from a PTO mode:
  determine a maximum engine speed threshold value below which the vehicle is configured to operate;
  determine the current engine speed;
  provide, in relation to the tachometer, an indication of the maximum engine speed threshold value;
  determine an engine speed warning threshold value based on the maximum engine speed threshold value;
  provide, in relation to the tachometer, a first visual overspeed indication when the current engine speed meets or exceeds the engine speed warning threshold value and is less than the maximum engine speed threshold value.

9. The system of claim 8, wherein the instructions further cause the system to
  update the first visual overspeed indication to a second visual overspeed indication when a subsequent engine speed meets or exceeds the maximum engine speed threshold value.

10. The system of claim 9, wherein the first visual overspeed indication includes a display of increased line weight and a shift in color from the indication of the maximum engine speed threshold value.

11. The system of claim 10, wherein the second visual overspeed indication includes at least one of:
  a display of increased line weight from the first visual overspeed indication;
  a glow in a background of the tachometer; and
  an audible alert.

12. A method of providing a dynamic tachometer, comprising:
  displaying, via a digital tachometer on a display of a vehicle, an indication of a current engine speed of the vehicle in relation to a range of normal operating mode engine rotation speeds; and
  in response to receiving an indication of actuation of a power takeoff (PTO), updating the digital tachometer to:
    replace the range of normal operating mode engine rotation speeds with a range of engine rotation speeds associated with PTO operation; and
    include a visual indication of upper and lower PTO operation engine speed limit values.

13. The method of claim 12, further comprising:
  accessing a preset engine speed value associated with a PTO mode;
  displaying an indication of the preset engine speed value in a first state in relation to the range of engine rotation speeds associated with PTO operation; and
  when the PTO mode is engaged and PTO speed control is active, updating the display of the indication of the preset engine speed value to a second state to indicate engagement of the PTO mode and activation of the PTO speed control.

14. The method of claim 13, further comprising updating the digital tachometer to include a visual indication of a type associated with the PTO mode.

15. The method of claim 13, wherein the PTO mode is selected from among a plurality of available PTO modes, each of the available PTO modes being associated with one or more present engine speed values.

16. The method of claim 12, further comprising displaying a PTO display card including two or more of a PTO digital tachometer, a PTO RPM digital readout, PTO engine hours, engine torque, or diesel particulate filter (DPF) status.

17. The method of claim 12, further comprising, while in a normal operating mode different from a PTO mode:
  determining a maximum engine speed threshold value below which the vehicle is configured to operate;
  determining the current engine speed;
  providing, in relation to the tachometer, an indication of the maximum engine speed threshold value;
  determining an engine speed warning threshold value based on the maximum engine speed threshold value; and
  providing, in relation to the tachometer, a first visual overspeed indication when the current engine speed meets or exceeds the engine speed warning threshold value and is less than the maximum engine speed threshold value.

18. The method of claim 17, further comprising updating the first visual overspeed indication to a second visual overspeed indication when a subsequent engine speed meets or exceeds the maximum engine speed threshold value.

19. A method comprising:
  determining a maximum engine speed threshold value below which a vehicle is configured to operate;
  providing, in relation to a digital tachometer, an indication of the maximum engine speed threshold value;
  determining an engine speed warning threshold value based on the maximum engine speed threshold value;
  providing, in relation to the tachometer, a first visual overspeed indication when an engine speed of the vehicle meets or exceeds the engine speed warning threshold value and is less than the maximum engine speed threshold value; and
  updating the first visual overspeed indication to a second visual overspeed indication when a subsequent engine speed of the vehicle meets or exceeds the maximum engine speed threshold value.

20. The method of claim 19, further comprising:
  displaying, via the digital tachometer on a display of the vehicle, an indication of a current engine speed of the vehicle in relation to a range of normal operating mode engine rotation speeds; and
  in response to receiving an indication of actuation of a power takeoff (PTO), updating the digital tachometer to:
    replace the range of normal operating mode engine rotation speeds with a range of engine rotation speeds associated with PTO operation; and
    include a visual indication of upper and lower PTO operation engine speed limit values.

* * * * *